US012757191B2

(12) United States Patent
Shimezawa et al.

(10) Patent No.: US 12,757,191 B2
(45) Date of Patent: Oct. 6, 2026

(54) TERMINAL DEVICE, BASE STATION DEVICE, AND COMMUNICATION METHOD

(71) Applicant: Sony Group Corporation, Tokyo (JP)

(72) Inventors: Kazuyuki Shimezawa, Tokyo (JP); Naoki Kusashima, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 311 days.

(21) Appl. No.: 18/577,706

(22) PCT Filed: Mar. 15, 2022

(86) PCT No.: PCT/JP2022/011511
§ 371 (c)(1),
(2) Date: Jan. 9, 2024

(87) PCT Pub. No.: WO2023/002686
PCT Pub. Date: Jan. 26, 2023

(65) Prior Publication Data

US 2024/0323952 A1 Sep. 26, 2024

(30) Foreign Application Priority Data

Jul. 19, 2021 (JP) ................................ 2021-119074

(51) Int. Cl.
*H04W 72/1263* (2023.01)
*H04W 72/23* (2023.01)
(Continued)

(52) U.S. Cl.
CPC ....... *H04W 72/1263* (2013.01); *H04W 72/23* (2023.01); *H04W 72/232* (2023.01); *H04L 5/0053* (2013.01)

(58) Field of Classification Search
None
See application file for complete search history.

(56) References Cited

U.S. PATENT DOCUMENTS 8,223,712 B2 * 7/2012 Kim ...................... H04L 5/0094 370/252
2019/0081841 A1 * 3/2019 Kim ...................... H04L 5/0053
(Continued)

FOREIGN PATENT DOCUMENTS

JP 2021-516522 A 7/2021
WO 2021/186700 A1 9/2021

OTHER PUBLICATIONS

HUAWEI: "Feature lead summary#2 of HARQ enhancements for NR-U", Aug. 26, 2019 (Aug. 26, 2019), pp. 1-29, XP051766288.
(Continued)

*Primary Examiner* — Jason D Cardone
(74) *Attorney, Agent, or Firm* — XSENSUS LLP

(57) ABSTRACT

A terminal device includes a transceiver and a hardware processor. The hardware processor receives one physical downlink control channel (PDCCH) via the transceiver. The one PDCCH schedules a plurality of physical shared channels in one or more carriers or one or more slots. The one PDCCH and the plurality of physical shared channels are transmitted to the terminal device. The plurality of physical shared channels is a plurality of physical downlink shared channels (PDSCH) or a plurality of physical uplink shared channels (PUSCH).

24 Claims, 19 Drawing Sheets

(51) Int. Cl.
*H04W 72/232* (2023.01)
*H04L 5/00* (2006.01)

(56) References Cited

U.S. PATENT DOCUMENTS

2021/0007127 A1* 1/2021 Hwang ................. H04L 1/0071
2021/0143948 A1* 5/2021 Choi ..................... H04L 5/0012
2021/0385826 A1* 12/2021 Moon ................... H04W 72/23
2022/0408464 A1* 12/2022 MolavianJazi ... H04W 72/0453
2022/0408472 A1* 12/2022 Matsumura ........... H04L 1/1887
2023/0092884 A1* 3/2023 Bae ....................... H04L 5/0051 455/522
2023/0141660 A1* 5/2023 Matsumura ........... H04W 16/28 370/329
2023/0300834 A1* 9/2023 Blankenship ......... H04L 5/0094 370/329
2023/0396385 A1* 12/2023 Kwak ................... H04L 5/0051
2024/0056969 A1* 2/2024 Papasakellariou ........................... H04W 52/0216
2025/0016779 A1* 1/2025 Huang .................. H04L 5/0094

OTHER PUBLICATIONS

LG Electronics: "Discussion on common aspects in TDD NB-IoT",Feb. 26, 2018 (Feb. 26, 2018), XP051397184.
International Search Report and Written Opinion mailed on Jun. 21, 2022, received for PCT Application PCT/JP2022/011511, filed on Mar. 15, 2022, 9 pages including English Translation.
3GPP, "3rd Generation Partnership Project; Technical Specification Group Radio Access Network; NR; Physical layer procedures for data (Release 16)", 3GPP TS 38.214 V16.6.0, Jun. 2021, pp. 1-172.
Panasonic, "HARQ enhancment for NR-U", 3GPP TSG RAN WG1 #99 R1-1912771, Nov. 18-22, 2019, pp. 1-11.

* cited by examiner

TERMINAL DEVICE, BASE STATION DEVICE, AND COMMUNICATION METHOD

CROSS-REFERENCE TO RELATED APPLICATIONS

The present application is based on PCT filing PCT/JP2022/011511, filed Mar. 15, 2022, which claims priority from Japanese Patent Application No 2021-119074, filed Jul. 19, 2021, the contents of each are hereby incorporated by reference.

FIELD

The present disclosure relates to a terminal device, a base station device, and a communication method.

BACKGROUND

Radio access methods and radio networks for cellular mobile communication (hereinafter, also referred to as "Long Term Evolution (LTE)", "LTE-Advanced (LTE-A)", "LTE-Advanced Pro (LTE-A Pro)", "New Radio (NR)", "New Radio Access Technology (NRAT)", "Evolved Universal Terrestrial Radio Access (EUTRA)", or "Further EUTRA (FEUTRA)") have been studied in the 3rd Generation Partnership Project (3GPP). Note that LTE includes LTE-A, LTE-A Pro, and EUTRA, and NR includes NRAT and FEUTRA in the following description. In LTE and NR, a base station device (base station) is also referred to as an evolved NodeB (eNodeB), and a terminal device (mobile station, mobile station device, and terminal) is also referred to as user equipment (UE). However, the base station device may also be referred to as a gNodeB or a gNB. LTE and NR are cellular communication systems in which a plurality of areas covered by the base station device is arranged in a cell shape. A single base station device may manage a plurality of cells.

As a next-generation radio access method for LTE, NR is a radio access technology (RAT) different from LTE. NR is the access technology that can support various use cases including enhanced mobile broadband (eMBB), massive machine type communications (mMTC), and ultra-reliable and low latency communications (URLLC). In 3GPP, standardization of NR supporting these use cases has been advanced.

Here, the eMBB is an important use case for implementing streaming transmission of high-definition video and high-speed large-capacity communication of augmented reality (AR) and virtual reality (VR). In addition, URLLC is an important use case of 5G as a use case requiring high reliability and low delay communication, such as automatic driving and automation factory.

CITATION LIST

Non Patent Literature

Non Patent Literature 1: "3GPP TS38.214 version 16.6.0 Release 16", [online], [Searched on Jul. 7, 2021], Internet <https://www.3gpp.org/ftp//Specs/archive/38_series/38.214/3 8214-g60.zip>

SUMMARY

Technical Problem

However, in 5G in related art, standards of a function and technology necessary for implementing each use case have been individually formulated. Specifically, in the technology of implementing the eMBB, standards have been formulated for the purpose of implementing broadband transmission and improving frequency utilization efficiency. On the other hand, in the technology of implementing URLLC, standards have been formulated for the purpose of improving reliability and transmission delay in exchange for sacrificing frequency utilization efficiency.

In a next-generation radio communication system called Beyond 5G or 6G, an area where these use cases overlap each other has been studied as a new use case. For example, in use cases such as digital twin and tactile communication, it is required to implement requirements of both high-speed large-capacity communication and high-quality and low-delay communication. In other words, in order to implement such a use case, broadband transmission, improvement in frequency utilization efficiency, and improvement in reliability and transmission delay are simultaneously required.

Thus, the present disclosure provides a mechanism capable of implementing broadband transmission, improvement in frequency utilization efficiency, and improvement in reliability and transmission delay together.

Note that the above problem or object is merely one of a plurality of problems or objects that can be solved or achieved by a plurality of embodiments disclosed in the present specification.

Solution to Problem

According to the present disclosure, a terminal device is provided. The terminal device includes a transceiver and a hardware processor. The hardware processor receives one physical downlink control channel (PDCCH) via the transceiver. The one PDCCH schedules a plurality of physical shared channels in one or more carriers or one or more slots. The one PDCCH and the plurality of physical shared channels are transmitted to the terminal device. The plurality of physical shared channels is a plurality of physical downlink shared channels (PDSCH) or a plurality of physical uplink shared channels (PUSCH).

DESCRIPTION OF EMBODIMENTS

Figure 1:
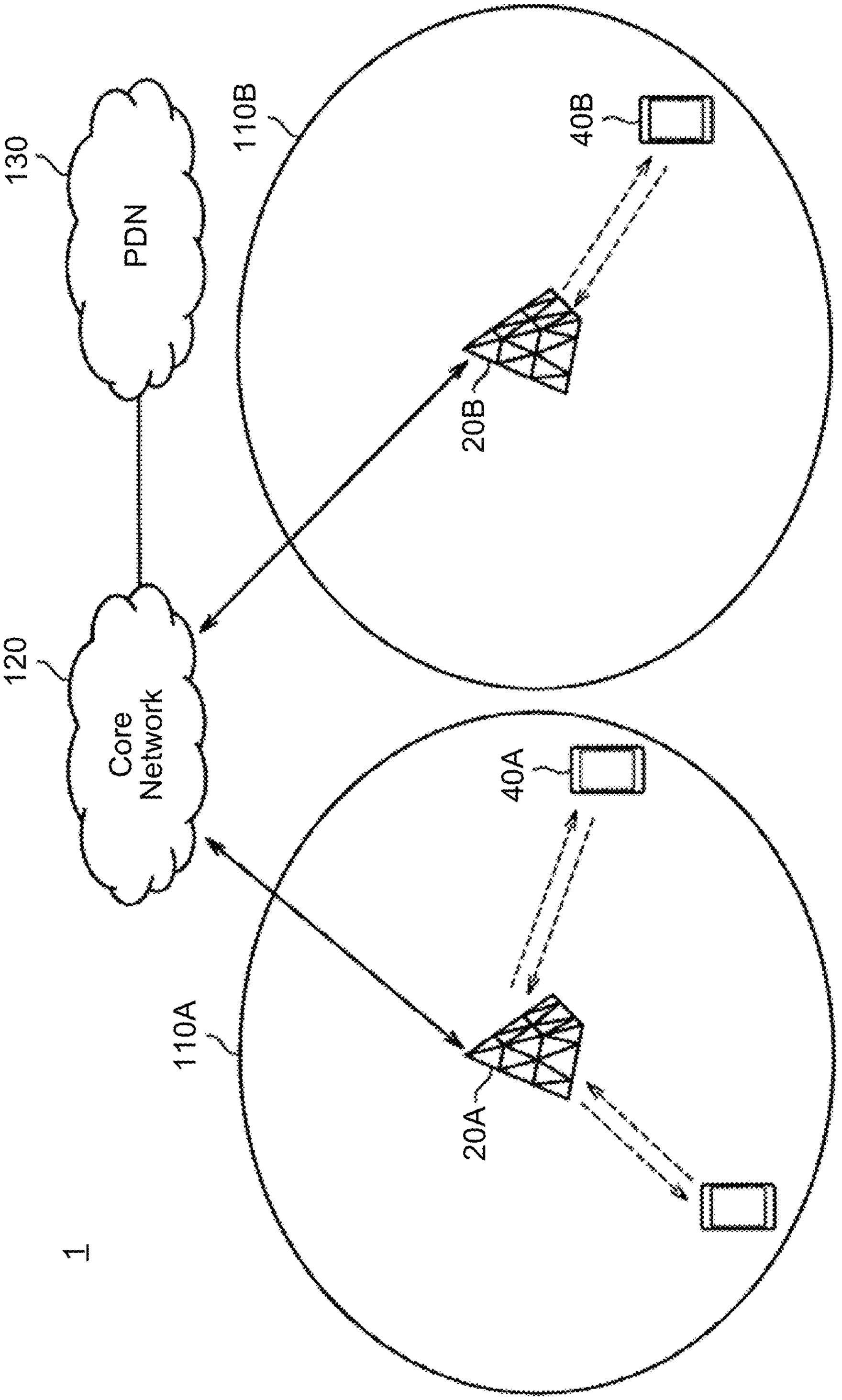
FIG. 1 is a view illustrating an example of an overall configuration of a communication system according to an embodiment of the present disclosure.

In the following, embodiments of the present disclosure will be described in detail with reference to the accompanying drawings. Note that the same reference signs are assigned to components having substantially the same functional configuration, and overlapped description is omitted in the present specification and the drawings.

Furthermore, in the present specification and the drawings, similar components of embodiments may be distinguished by assignment of different alphabets or numbers after the same reference sign. However, in a case where it is not specifically necessary to distinguish the similar components from each other, only the same reference sign is assigned.

Each of one or a plurality of embodiments (including examples and modification examples) described in the following can be performed independently. On the other hand, at least a part of the plurality of embodiments described in the following may be appropriately combined with at least a part of the other embodiments. The plurality of embodiments may include novel features different from each other. Thus, the plurality of embodiments can contribute to solving objects or problems different from each other, and can exhibit effects different from each other.

1. Introduction

<1.1. PDSCH/PUSCH Mapping Type>

First, a mapping type of conventional PDSCH/PUSCH will be described. In both the PDSCH and PUSCH, two different mapping types (mapping methods) called a type A and a type B are prescribed. These types are defined by DMRS types (PDSCH DMRS type and PUSCH DMRS type) and SLIV tables illustrated in Table 1 and Table 2. Note that the SLIV tables illustrated in Table 1 and Table 2 are described in TS 38.214.

TABLE 1

| PDSCH | Normal cyclic prefix | | | Extended cyclic prefix | | |
|---|---|---|---|---|---|---|
| mapping type | S | L | S + L | S | L | S + L |
| Type A | {0, 1, 2, 3} | {3, . . . , 14} | {3, . . . , 14} | {0, 1, 2, 3} | {3, . . . , 12} | {3, . . . , 12} |
| Type B | {0, . . . , 12} | {2, 4, 7} | {2, . . . , 14} | {0, . . . , 10} | {2, 4, 6} | {2, . . . , 12} |

TABLE 2

| PUSCH | Normal cyclic prefix | | | Extended cyclic prefix | | |
|---|---|---|---|---|---|---|
| mapping type | S | L | S + L | S | L | S + L |
| Type A | 0 | {4, . . . , 14} | {4, . . . , 14} | 0 | {4, . . . , 12} | {4, . . . , 12} |
| Type B | {0, . . . , 13} | {1, . . . , 14} | {1, . . . , 14} | {0, . . . , 12} | {1, . . . , 12} | {1, . . . , 12} |

The SLIV tables are used for mapping of a PDSCH or a PUSCH in a predetermined slot (resource in a time domain including 14 OFDM symbols) to a time resource. S is information indicating a start symbol in the predetermined slot. For example, S=0 indicates a first symbol in the slot. L is a symbol length (time length) of the PDSCH or PUSCH mapped to the resource. For example, L=4 indicates a 4-symbol PDSCH or PUSCH.

The mapping type A is a type suitable for use cases of high-speed communication and large-capacity communication such as eMBB. The mapping type B is a type suitable for use cases of low delay communication and high reliability communication such as URLLC.

[PDSCH]

Details of the PDSCH mapping type will be described in the following.

(Type A)

A PDSCH DMRS is the type A. A position of the DMRS is fixed to a third position (pos2) or a fourth position (pos3). That is, a DMRS symbol is mapped to a symbol 2 or 3 regardless of a start and length of the PDSCH.

A start symbol of the PDSCH can be any symbol of 0 to 3. A symbol length of the PDSCH is set to 3 to 14 in a case of normal CP and 3 to 12 in a case of extended CP.

(Type B)

A PDSCH DMRS is the type B. A position of the DMRS is fixed to a first symbol of an allocated PDSCH. That is, a DMRS symbol is mapped to a first PDSCH symbol regardless of a start of the PDSCH.

A start symbol of the PDSCH is any symbol of 3 to 14 in a case of normal CP. In addition, in a case of extended CP, the start symbol of the PDSCH is any symbol of 0 to 10.

A symbol length of the PDSCH is set to any one of 2, 4, and 7 in a case of the normal CP, and is set to any one of 2, 4, and 6 in a case of the extended CP.

[PUSCH]

Details of the PUSCH mapping type will be described in the following.

(Type A)

A PUSCH DMRS is the type A. A position of the DMRS is fixed to a third position (pos2) or a fourth position (pos3). A start symbol of the PUSCH is always 0.

A symbol length of the PUSCH is set to 4 to 14 in a case of the normal CP and 4 to 12 in a case of the extended CP.

(Type B)

A PUSCH DMRS is the type B. A position of the DMRS is fixed to a first symbol of an allocated PUSCH.

A start symbol of the PUSCH is any one symbol of 0 to 13 in a case of the normal CP. In addition, in a case of the extended CP, the start symbol of the PDSCH is any symbol of 0 to 12.

A symbol length of the PUSCH is set to 1 to 14 in a case of the normal CP and 1 to 12 in a case of the extended CP.

<1.2. Problem>

Broadband transmission, improvement in frequency utilization efficiency, and improvement in reliability and transmission delay are requirements for different purposes. Thus, there is a trade-off relationship between some of these points.

In addition, even in a use case in which high-speed large-capacity communication and high-quality and low-delay communication overlap each other, emphasis may be placed on any of these depending on a specific use case.

Conventional communication methods do not consider such a use case, and do not support efficient data transmission supporting both high-speed large-capacity communication and high-quality and low-delay communication.

Specifically, in related art, one piece of control information (DCI or PDCCH) schedules one piece of transmission data (PDSCH or PUSCH). In URLLC transmission, a case where a data size (payload size) of transmission data is small is assumed. Thus, there is no specific problem in the related art in which one piece of transmission data is scheduled by one piece of control information.

However, in a case where high-speed large-capacity communication is further performed in the URLLC transmission, the data size of the transmission data increases. In this case, when a time length of one piece of the transmission data is shortened in order to implement low delay transmission, that is, when the transmission data having a large data size is divided into a plurality of pieces and transmitted, an overhead related to the control information increases. As described above, in a case where the high-speed large-capacity communication is implemented in the URLLC transmission, improvement in frequency utilization efficiency is a problem.

<1.3. Outline of Proposed Technology>

Thus, in the proposed technology of the present disclosure, a terminal device receives one PDCCH transmitted from a base station. The one PDCCH schedules a plurality of physical shared channels in one or more carriers or one or more slots. The one PDCCH and the plurality of physical shared channels scheduled by the one PDCCH are transmitted to one terminal device. Note that the plurality of physical shared channels includes a plurality of PDSCHs or a plurality of PUSCHs.

In addition, among communication parameters applied to the plurality of physical shared channels scheduled by the one PDCCH described above, a part of the communication parameters is commonly applied to the plurality of physical shared channels. Furthermore, the remaining communication parameters are respectively applied to the plurality of physical shared channels in a dedicated manner.

As described above, in the proposed technology of the present disclosure, the base station device schedules the plurality of physical shared channels in one or more carriers or one or more slots by using the one PDCCH. As a result, the base station device can reduce an overhead related to control information even in a case where transmission data having a large data size is divided into a plurality of pieces and transmitted. That is, in a case where the high-speed large-capacity communication is implemented in the URLLC transmission, the base station device can further improve frequency utilization efficiency.

2. Configuration of a Communication System

<2.1. Overall Configuration of the Communication System>

FIG. 1 is a view illustrating an example of an overall configuration of a communication system 1 according to an embodiment of the present disclosure. As illustrated in FIG. 1, the communication system 1 includes a plurality of base station devices 20 (20A and 20B), a plurality of terminal devices 40 (40A and 40B), a core network 120, and a packet data network (PDN) 130. Note that the number of devices is not limited to the above, and for example, there may be one base station device 20 and one terminal device 40.

Each of the base station devices 20 is a communication device that operates a cell 110 and provides a radio communication service to one or more terminal devices 40 located inside coverage of the cell 110. The cell 110 is operated according to an arbitrary radio communication method such as LTE or NR. The base station device 20 is connected to the core network 120. The core network 120 is connected to a packet data network (PDN) 130 via a gateway device (not illustrated). Note that the base station device 20 may include a set of a plurality of physical or logical devices. For example, in the embodiment of the present disclosure, the base station device 20 may be distinguished into a plurality of devices such as a baseband unit (BBU) and a radio unit (RU), and may be interpreted as an assembly of the plurality of devices. In addition or alternatively, the base station device 20 may be either or both of the BBU and the RU in the embodiment of the present disclosure. The BBU and the RU may be connected by a predetermined interface (such as eCPRI). In addition or alternatively, the RU may be referred to as a remote radio unit (RRU) or radio DoT (RD). In addition or alternatively, the RU may correspond to a gNB-DU (described later). In addition or alternatively, the BBU may correspond to a gNB-CU (described later). Alternatively, a part of the BBU may correspond to the gNB-DU (described later), and the rest may correspond to a GNB-CU (described later). In addition or alternatively, the RU may be a device integrally formed with an antenna. An antenna (such as the antenna integrally formed with the RU) included in the base station device 20 may adopt an advanced antenna system and support MIMO (such as FD-MIMO) or beamforming. In the advanced antenna system, the antenna (such as the antenna integrally formed with the RU) included in the base station device 20 may include, for example, 64 transmission antenna ports and 64 reception antenna ports.

Furthermore, the plurality of base station devices 20 may be connected to each other. The one or plurality of base station devices 20 may be included in a radio access network (RAN). That is, the base station device 20 may be simply referred to as a RAN, a RAN node, an access network (AN), or an AN node. RAN in LTE is referred to as an enhanced universal terrestrial RAN (EUTRAN). RAN in NR is referred to as NGRAN. RAN in W-CDMA (registered trademark) (UMTS) is referred to as UTRAN. Note that the base station device 20 in LTE may be referred to as an evolved Node B (eNodeB) or eNB. That is, the EUTRAN includes one or a plurality of eNodeBs (eNBs). Furthermore, the base station device 20 in NR may be referred to as a gNodeB or gNB. That is, the NGRAN includes one or a plurality of gNBs. Furthermore, the EUTRAN may include a gNB connected to a core network (EPC) in an LTE communication system (EPS) (en-gNB). Similarly, the NGRAN may include an ng-eNB connected to a core network 5GC in a 5G communications system (5GS). In addition or alternatively, in a case of being the eNB, gNB, or the like, the base station device 20 may be referred to as 3GPP Access. In addition or alternatively, in a case of being a radio access point, the base station device 20 may be referred to as Non-3 GPP Access. In addition or alternatively, the base station device 20 may be remote radio equipment called a remote radio head (RRH). In addition or alternatively, in a case where the base station device 20 is the gNB, the base station device 20 may be referred to as a combination or any one of the above-described gNB central unit (CU) and gNB distributed unit (DU). The gNB central unit (CU) hosts a plurality of upper layers (such as RRC, SDAP, and PDCP) of an access stratum for communication with the UE. On the other hand, the gNB-DU hosts a plurality of lower layers (such as RLC, MAC, and PHY) of the access stratum. That is, among messages and information described later, RRC signalling (such as various SIBs including a MIB and an SIB1, an RRCSetup message, and an RRCReconfiguration message) may be generated by the gNB CU and DCI and various physical channels (such as PDCCH and PBCH) (described later) may be generated by the gNB-DU. In addition or alternatively, in the RRC signalling, a part of configurations such as IE: cellGroupConfig may be generated by the gNB-DU, and the remaining configurations may be generated by the gNB-CU, for example. These configurations may be transmitted and received by an F1 interface (described later). The base station device 20 may be configured to be able to communicate with another base station device 20. For example, in a case where the plurality of base station devices 20 is the eNBs or a combination of the eNB and the en-gNB, the base station devices 20 may be connected by an X2 interface. In addition or alternatively, in a case where the plurality of base station devices 20 is the gNBs or a combination of the gn-eNB and the gNB, the devices may be connected by an Xn interface. In addition or alternatively, in a case where the plurality of base station devices 20 is a combination of the gNB central unit (CU) and the gNB distributed unit (DU), the devices may be connected by the above-described F1 interface. A message and information (information of RRC signalling or DCI, and a physical channel) (described later) may be communicated between the plurality of base station devices 20 (via X2, Xn, or F1 interface, for example).

In addition, as described above, the base station device 20 may be configured to manage the plurality of cells 110. The cells 110 provided by the base station device 20 are referred to as serving cells. The serving cells include a primary cell (PCell) and a secondary cell (SCell). In a case where dual connectivity (such as EUTRA-EUTRA dual connectivity, EUTRA-NR dual connectivity (ENDC), EUTRA-NR dual connectivity with 5GC, NR-EUTRA dual connectivity (NEDC), and NR-NR dual connectivity) is provided to UE (such as the terminal device 40), the PCell and zero or one or more SCell (s) provided by a master node (MN) are referred to as a master cell group. Furthermore, the serving cell may include a PSCell (primary secondary cell or primary SCG cell). That is, in a case where the dual connectivity is provided to the UE, the PSCell and the zero or one or more SCell (s) provided by a secondary node (SN) are referred to as a secondary cell group (SCG). Unless special setting (such as PUCCH on SCell) is made, a physical uplink control channel (PUCCH) is not transmitted in the SCell although being transmitted in the PCell and the PSCell. In addition, radio link failure is not detected (may not be detected) in the SCell although being detected in the PCell and the PSCell. As described above, the PCell and the PSCell are also referred to as special cells (SpCells) since having a special role in the serving cell (s). One downlink component carrier and one uplink component carrier may be associated with one cell 110. In addition, a system bandwidth corresponding to the one cell 110 may be divided into a plurality of bandwidth parts. In this case, one or a plurality of bandwidth parts (BWP) may be set for the UE, and one bandwidth part may be used for the UE as an active BWP. In addition, radio resources that can be used by the terminal device 40 (such as a frequency band, numerology (subcarrier spacing), and a slot format (slot configuration)) may vary depending on the cells 110, component carriers, or the BWPs.

In a case where the core network 120 is an NR core network (5G core (5GC)), the core network 120 may include an access and mobility management function (AMF), a session management function (SMF), a user plane function (UPF), a policy control function (PCF), and unified data management (UDM).

In a case where the core network 120 is an LTE core network (evolved packet core (EPC)), the core network 120 may include a mobility management entity (MME), a serving gateway (S-GW), a PDN gateway (P-GW), a policy and charging rule function (PCRF), and a home subscriber server (HSS). The AMF and the MME are control nodes that handle control plane signals, and manage mobility of the terminal device 40. The UPF and the S-GW/P-GW are nodes that handle user plane signals. The PCF/PCRF is a control node that performs control related to policy and charging, such as quality of service (QOS) for a PDU session or a bearer. The UDM/HSS is a control node that handles subscriber data and performs service control.

The terminal device 40 is a communication device that performs radio communication with the base station device 20 on the basis of control by the base station device 20. The terminal device 40 is, for example, a sensor or a camera device having a communication function, a mobile phone, a smart device (smartphone or tablet), a personal digital assistant (PDA), or a personal computer. The terminal device 40 may be a head mounted display, VR goggles, or the like having a function of wirelessly transmitting and receiving data.

For example, the terminal device 40 performs radio communication with another terminal device 40 on the basis of control by the base station device 20 or autonomously. In this case, the terminal device 40 transmits a sidelink signal to the other terminal device 40 and receives a sidelink signal from the other terminal device 40 in a PC5 link. Hereinafter, the transmission and reception of the sidelink signals by the terminal device 40 will be collectively referred to as sidelink communication. The terminal device 40 may be able to use automatic retransmission technology such as hybrid automatic repeat request (HARQ) when performing the sidelink communication.

The terminal device 40 may be capable of non-orthogonal multiple access (NOMA) communication with the base station device 20. Note that the terminal device 40 may also be able to perform NOMA communication in communication (sidelink) with the other terminal device 40. Furthermore, the terminal device 40 may be able to perform low power wide area (LPWA) communication with other communication devices (such as the base station device 20 and the other terminal device 40). In addition, radio communication used by the terminal device 40 may be radio communication using millimeter waves. Note that the radio communication (including sidelink communication) used by the terminal device 40 may be radio communication using radio waves or radio communication using infrared rays or visible light (optical wireless).

The base station devices 20 can transmit and receive information to and from each other by using an inter-base station interface. In a case where the core network is the 5GC, the inter-base station interface may be the Xn interface. In a case where the core network is the EPC, the inter-base station interface may be the X2 interface.

Note that although not illustrated in FIG. 1, there may be a communication device that provides a radio communication service operated by another RAT such as Wi-Fi (registered trademark) or MulteFire (registered trademark) other than the cellular communication around the communication system 1. Such a communication devices is typically connected to the PDN 130.

<2.2. Configuration of a Base Station Device>

Figure 2:
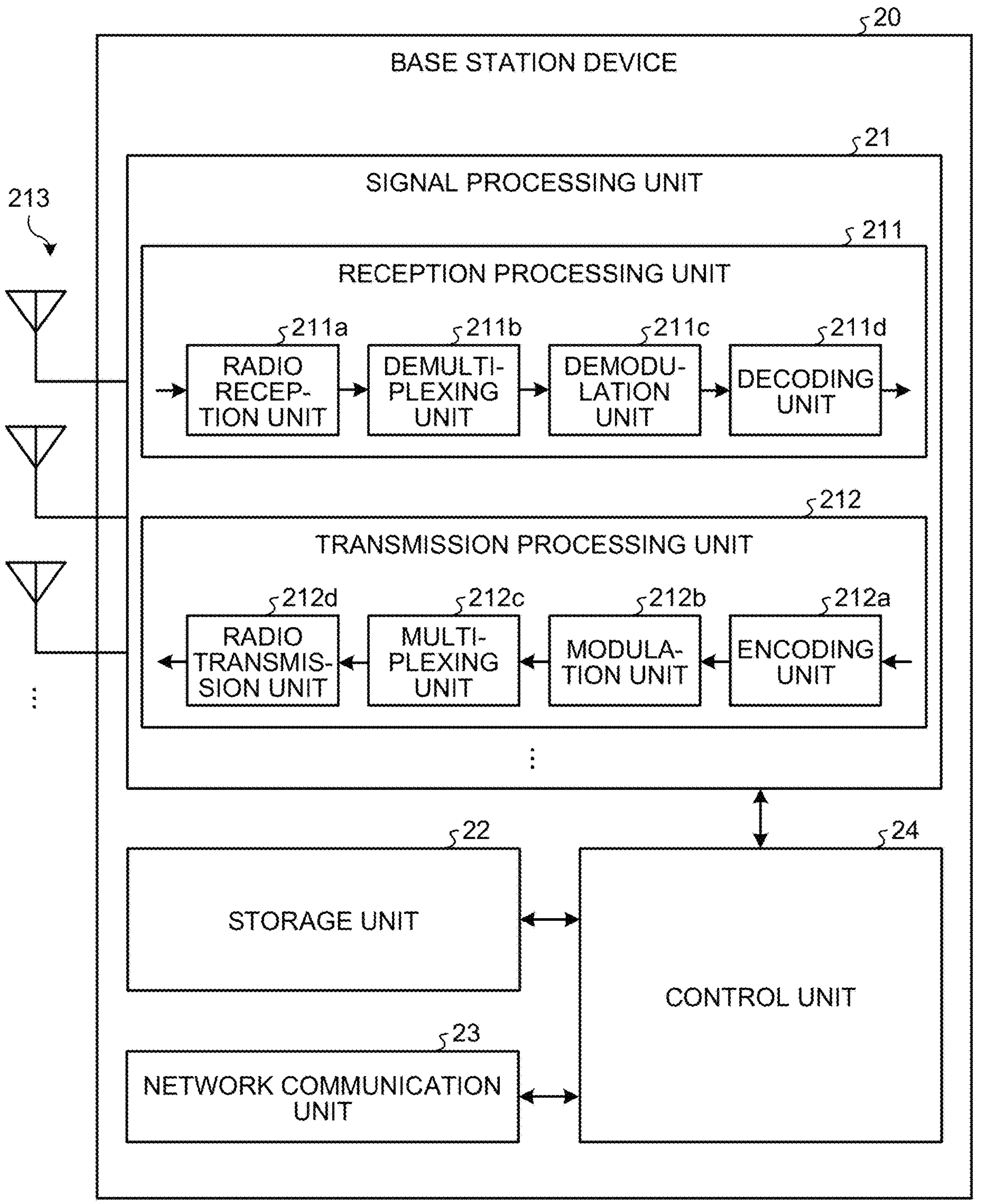
FIG. 2 is a view illustrating a configuration example of a base station device according to the embodiment of the present disclosure.

FIG. 2 is a view illustrating a configuration example of the base station device 20 according to the embodiment of the present disclosure. The base station device 20 is a communication device (radio system) that performs radio communication with the terminal device 40. The base station device 20 is a kind of information processing device.

The base station device 20 includes a signal processing unit 21, a storage unit 22, a network communication unit 23, and a control unit 24. Note that the configuration illustrated in FIG. 2 is a functional configuration, and a hardware configuration may be different therefrom. Furthermore, functions of the base station device 20 may be implemented in a manner of being distributed in a plurality of physically-separated devices.

The signal processing unit 21 is a radio communication interface that performs radio communication with other communication devices (such as the terminal device 40 and another base station device 20). The signal processing unit 21 is a radio transceiver that operates under the control of the control unit 24. The signal processing unit 21 may be compatible with a plurality of radio access methods. For example, the signal processing unit 21 may be compatible with both NR and LTE. The signal processing unit 21 may be compatible with other cellular communication methods such as W-CDMA and cdma2000. Furthermore, the signal processing unit 21 may be compatible with a wireless LAN communication method in addition to the cellular communication method. Obviously, the signal processing unit 21 may be compatible with only one radio access method.

The signal processing unit 21 includes a reception processing unit 211, a transmission processing unit 212, and an antenna 413. The signal processing unit 21 may include a plurality of the reception processing units 211, a plurality of the transmission processing units 212, and a plurality of the antennas 413. Note that in a case where the signal processing unit 21 is compatible with a plurality of radio access methods, each unit of the signal processing unit 21 can be configured separately for each of the radio access methods. For example, when the base station device 20 is compatible with NR and LTE, the reception processing unit 211 and the transmission processing unit 212 may be configured separately for NR and LTE.

The reception processing unit 211 processes an uplink signal received via the antenna 413. The reception processing unit 211 includes a radio reception unit 211*a*, a demultiplexing unit 211*b*, a demodulation unit 211*c*, and a decoding unit 211*d*.

The radio reception unit 211*a* performs down-conversion, a removal of an unnecessary frequency component, control of an amplification level, a quadrature demodulation, conversion into a digital signal, a removal of a guard interval, an extraction of a frequency domain signal by fast Fourier transform, and the like on the uplink signal. For example, it is assumed that the radio access method of the base station device 20 is a cellular communication method such as LTE. At this time, the demultiplexing unit 211*b* demultiplexes an uplink channel such as a physical uplink shared channel (PUSCH) or a physical uplink control channel (PUCCH) and an uplink reference signal from a signal output from the radio reception unit 211*a*. The demodulation unit 211*c* demodulates a received signal by using a modulation method such as binary phase shift keying (BPSK) or quadrature phase shift keying (QPSK) with respect to a modulation symbol of the uplink channel. The modulation method used by the demodulation unit 211*c* may be multi-level QAM such as 16 quadrature amplitude modulation (QAM), 64 QAM, or 256 QAM. The decoding unit 211*d* performs decoding processing on a demodulated encoded bit of the uplink channel. The decoded uplink data and uplink control information are output to the control unit 24.

The transmission processing unit 212 performs transmission processing of downlink control information and downlink data. The transmission processing unit 212 includes an encoding unit 212*a*, a modulation unit 212*b*, a multiplexing unit 212*c*, and a radio transmission unit 212*d*.

The encoding unit 212*a* encodes the downlink control information and downlink data input from the control unit 24 by using an encoding method such as block encoding, convolutional encoding, turbo encoding, or the like. The modulation unit 212*b* modulates encoded bits output from the encoding unit 212*a* by a predetermined modulation method such as BPSK, QPSK, 16-QAM, 64-QAM, or 256-QAM. The multiplexing unit 212*c* multiplexes a modulation symbol of each channel and a downlink reference signal, and performs an arrangement thereof in a predetermined resource element. The radio transmission unit 212*d* performs various kinds of signal processing on a signal from the multiplexing unit 212*c*. For example, the radio transmission unit 212*d* performs processing such as conversion into a time domain by fast Fourier transform, addition of a guard interval, generation of a baseband digital signal, conversion into an analog signal, a quadrature modulation, up-conversion, a removal of an extra frequency component, and power amplification. A signal generated by the transmission processing unit 212 is transmitted from the antenna 413.

The storage unit 22 is a data readable/writable storage device such as a DRAM, an SRAM, a flash memory, or a hard disk. The storage unit 22 functions as a storage means of the base station device 20.

The network communication unit 23 is a communication interface for communicating with other devices (such as another base station device 20). For example, the network communication unit 23 is a local area network (LAN) interface such as a network interface card (NIC). The network communication unit 23 may be a universal serial bus (USB) interface including a USB host controller, a USB port, and the like. Furthermore, the network communication unit 23 may be a wired interface or a radio interface. The network communication unit 23 functions as a network communication means of the base station device 20. The network communication unit 23 communicates with other devices under the control of the control unit 24.

The control unit 24 is a controller that controls each unit of the base station device 20. The control unit 24 is a hardware processor that controls each unit of the base station device 20. The control unit 24 is implemented by, for example, a processor such as a central processing unit (CPU) or a micro processing unit (MPU). For example, the control unit 24 is implemented by a processor executing various programs, which are stored in a storage device inside the base station device 20, by using a random access memory (RAM) or the like as a work area. Note that the control unit 24 may be implemented by an integrated circuit such as an application specific integrateDCIrcuit (ASIC) or a field programmable gate array (FPGA). Each of the CPU, MPU, ASIC, and FPGA can be regarded as a controller.

<2.3. Configuration of a Terminal Device>

Figure 3:
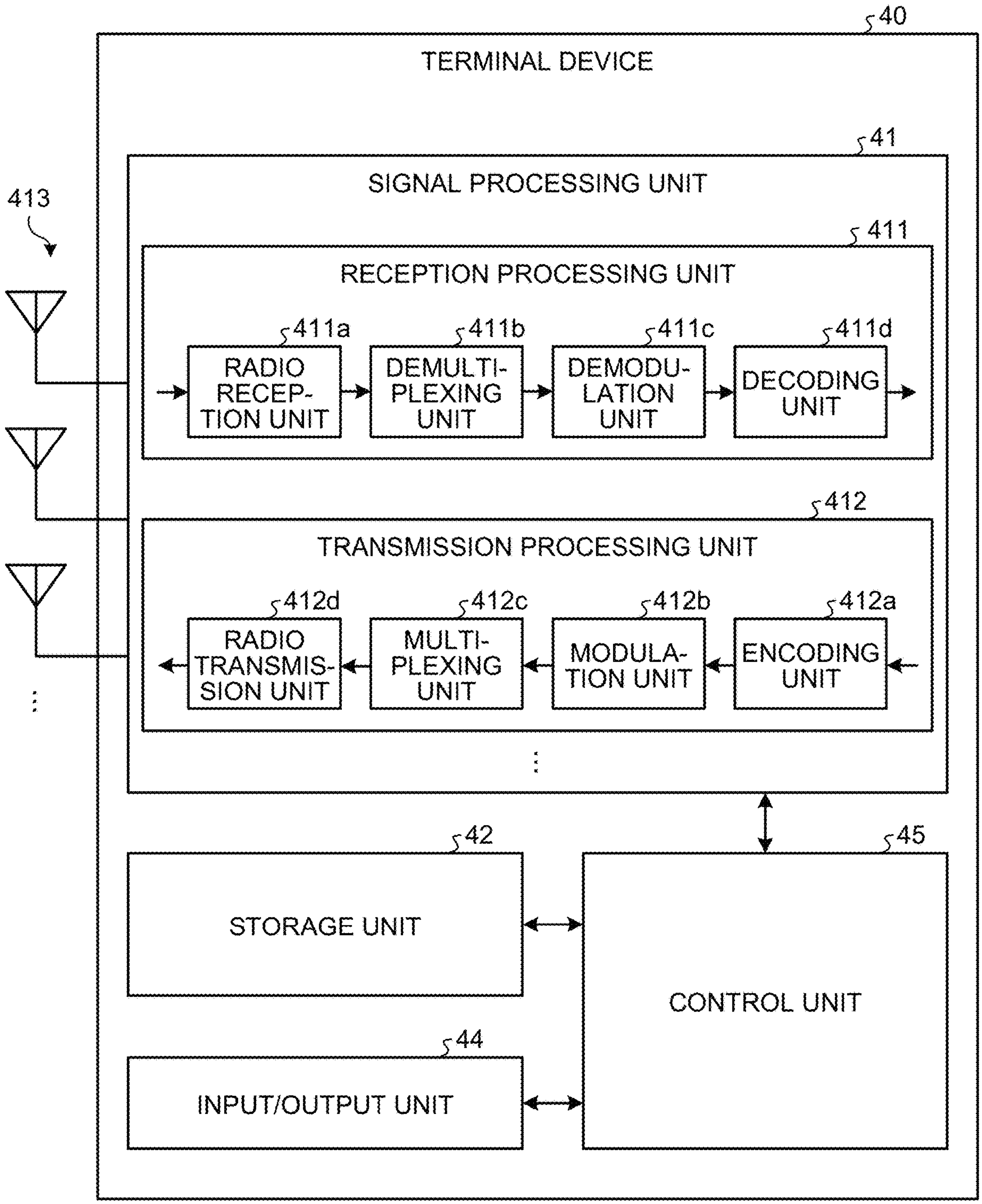
FIG. 3 is a view illustrating a configuration example of a terminal device according to the embodiment of the present disclosure.

FIG. 3 is a view illustrating a configuration example of the terminal device 40 according to the embodiment of the present disclosure. The terminal device 40 is a communication device (radio system) that performs radio communication with the base station device 20. The terminal device 40 is a kind of information processing device.

The terminal device 40 includes a signal processing unit 41, a storage unit 42, an input/output unit 44, and a control unit 45. Note that the configuration illustrated in FIG. 3 is a functional configuration, and a hardware configuration may be different therefrom. Furthermore, functions of the terminal device 40 may be implemented in a manner of being distributed in a plurality of physically-separated configurations.

The signal processing unit 41 is a radio communication interface that performs radio communication with other communication devices (such as the base station device 20 and another terminal device 40). The signal processing unit 41 is a radio transceiver that operates under control of the control unit 45. The signal processing unit 41 is compatible with one or a plurality of radio access methods. For example, the signal processing unit 41 is compatible with both NR and LTE. The signal processing unit 41 may be compatible with other radio access methods such as W-CDMA and cdma2000.

The signal processing unit 41 includes a reception processing unit 411, a transmission processing unit 412, and an antenna 313. The signal processing unit 41 may include a plurality of the reception processing units 411, a plurality of the transmission processing units 412, and a plurality of the antennas 313. Note that in a case where the signal processing unit 41 is compatible with a plurality of radio access methods, each unit of the signal processing unit 41 can be configured separately for each of the radio access methods. For example, the reception processing unit 411 and the transmission processing unit 412 may be configured separately for LTE and NR. Configurations of the reception processing unit 411 and the transmission processing unit 412 are similar to those of the reception processing unit 211 and the transmission processing unit 212 of the base station device 20.

The storage unit 42 is a data readable/writable storage device such as a DRAM, an SRAM, a flash memory, or a hard disk. The storage unit 42 functions as a storage means of the terminal device 40.

The input/output unit 44 is a user interface for exchanging information with a user. For example, the input/output unit 44 is an operation device for a user to perform various operations, such as a keyboard, mouse, operation key, and touch panel. Alternatively, the input/output unit 44 is a display device such as a liquid crystal display or an organic electroluminescence display (organic EL display). The input/output unit 44 may be an acoustic device such as a speaker or buzzer. Furthermore, the input/output unit 44 may be a lighting device such as a light emitting diode (LED) lamp. The input/output unit 44 functions as an input/output means (input means, output means, operation means, or notification means) of the terminal device 40.

The control unit 45 is a controller that controls each unit of the terminal device 40. The control unit 24 is a hardware processor that controls each unit of the terminal device 40. The control unit 45 is implemented by, for example, a processor such as a CPU or an MPU. For example, the control unit 45 is implemented by the processor executing various programs, which are stored in the storage device inside the terminal device 40, by using a RAM or the like as a work area. Note that the control unit 45 may be implemented by an integrated circuit such as an ASIC or FPGA. Each of the CPU, MPU, ASIC, and FPGA can be regarded as a controller.

3. Technical Features

<3.1. Scheduling Method>

Figure 4:
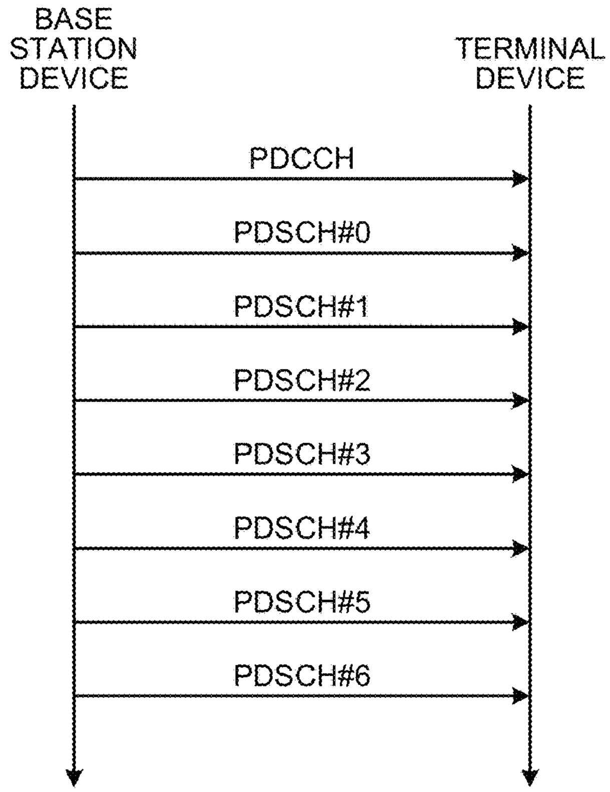
FIG. 4 is a view illustrating an example of a sequence diagram between the base station device and the terminal device according to the embodiment of the present disclosure.
Figure 5:
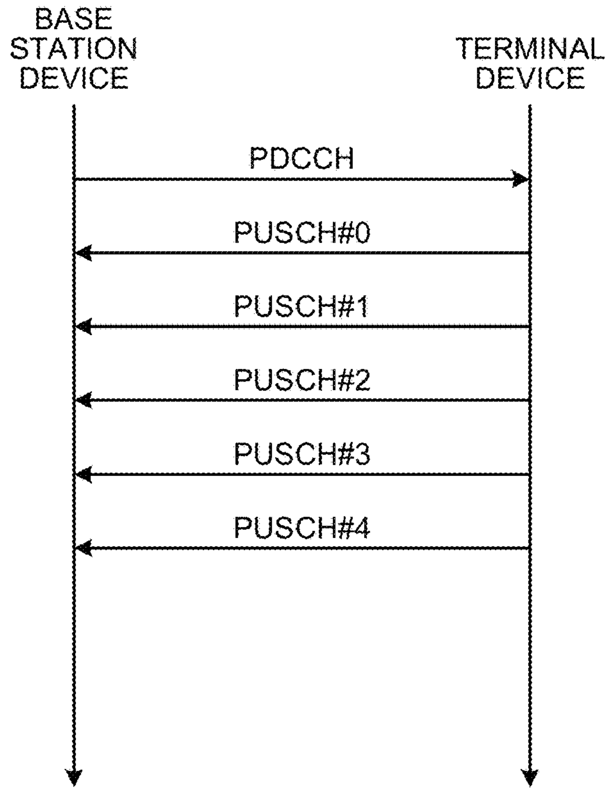
FIG. 5 is a view illustrating an example of the sequence diagram between the base station device and the terminal device according to the embodiment of the present disclosure.

Next, an example of a PDSCH/PUSCH scheduling method performed in the communication system 1 according to the embodiment of the present disclosure will be described. FIG. 4 and FIG. 5 are views illustrating examples of a sequence diagram between the base station device 20 and the terminal device 40 according to the embodiment of the present disclosure.

A case where the base station device 20 schedules a plurality of PDSCHs by using one PDCCH is illustrated in FIG. 4.

In a case where the base station device 20 schedules the PDSCHs for the terminal device 40, the base station device 20 transmits a PDCCH including downlink control information (DCI) to the terminal device 40 to be scheduled.

The terminal device 40 sequentially demodulates and decodes a predetermined number of candidates of the PDCCH by a predetermined method from a time-frequency resource called a control resource set (CORESET) that is set in advance by RRC signaling (e.g., transmission of RRCReconfiguration message, RRCSetup message, and the like), and detects a PDCCH to own device (blind detection).

The terminal device 40 recognizes whether the PDCCH is addressed to the own device on the basis of a parameter called a radio network temporary identifier (RNTI). In a case of detecting the PDCCH addressed to the own device, the terminal device 40 performs reception processing with the PDSCHs scheduled on the basis of DCI included in the PDCCH.

In FIG. 4, the base station device 20 schedules six PDSCHs #0 to #6 by one PDCCH. When detecting the PDCCH addressed to the own device, the terminal device 40 then performs the reception processing with the PDSCHs #0 to #6.

A case where the base station device 20 schedules a plurality of PUSCHs by using one PDCCH is illustrated in FIG. 5.

Similarly to FIG. 4, the terminal device 40 detects a PDCCH addressed to the own device. The terminal device 40 that detects the PDCCH addressed to the own device performs transmission processing with PUSCHs scheduled on the basis of DCI included in the PDCCH.

In FIG. 5, the base station device 20 schedules six PDSCHs #0 to #4 by one PDCCH. When detecting the PDCCH addressed to the own device, the terminal device 40 performs transmission processing with the PDSCHs #0 to #4.

As described above, the communication method according to the embodiment of the present disclosure is a method of scheduling the PDSCHs and/or the PUSCHs in one or more carriers and/or one or more slots by one PDCCH (or one piece of DCI).

In the communication method according to the embodiment of the present disclosure, in a case where the one PDCCH schedules the plurality of PDSCHs and/or PUSCHs, transmission parameters (reception parameters) of the plurality of PDSCHs and/or PUSCHs may be partially common. Alternatively, the transmission parameters (reception parameters) of the plurality of PDSCHs and/or PUSCHs may be notified in a dedicated manner. Whether the transmission parameters (reception parameters) are partially common or notified in a dedicated manner may be prescribed in advance. Alternatively, whether the transmission parameters (reception parameters) are partially common or notified in a dedicated manner may be set specifically for the cell 110 or specifically for the terminal device 40 through RRC signaling or the like. Hereinafter, in a case where the transmission parameters and the reception parameters are not specifically distinguished, the transmission parameters and the reception parameters are referred to as a communication parameter or a transmission parameter.

<3.2. Transmission Parameter>

As described above, the transmission parameters of the PDSCHs/PUSCHs may be transmitted from the base station device 20 to the terminal device 40 by RRC signaling (e.g., transmission in a manner of being included in the RRCReconfiguration message, RRCSetup message, and the like). In addition or alternatively, the transmission parameters of the PDSCHs/PUSCHs may be transmitted from the base station device 20 to the terminal device 40 by the PDCCH (e.g., DCI), or may be transmitted from the base station device 20 to the terminal device 40 by a combination of RRC signaling and the PDCCH. Here, the transmission parameters of the PDSCHs/PUSCHs according to the embodiment of the present disclosure are as follows. That is, the transmission parameters of the PDSCHs/PUSCHs according to the embodiment of the present disclosure may include at least one of a plurality of parameters described below.

[Parameter Related to Resource Mapping in a Time Domain]

The transmission parameters of the PDSCHs/PUSCHs may include the following parameters as parameters related to resource mapping in a time domain.

- Number of symbols (time length) of PDSCHs/PUSCHs
- Start position
- End position
- Information indicating a slot
- Number of PDSCHs/PUSCHs A parameter indicating the start position includes, for example, information indicating a first symbol number and/or slot number of the PDSCHs/PUSCHs. In addition, a parameter indicating the end position includes, for example, information indicating a last symbol number and/or slot number of the PDSCHs/PUSCHs.

The information indicating the slot includes a slot number (or a symbol number) specific to the cell 110 or offset information relatively indicating a slot (or symbol) to which the PDCCH is mapped.

The information indicating the number of PDSCHs/PUSCHs includes, for example, information indicating the number of PDSCHs/PUSCHs continuously scheduled in a time direction. As a result, in a case where parameters such as the number of symbols of the PDSCHs/PUSCHs to be scheduled are common, an overhead of the control information is reduced by notification of the information indicating the number of PDSCHs/PUSCHS.

[Parameter Related to Resource Mapping in a Frequency Domain]

The transmission parameters of the PDSCHs/PUSCHs may include the following parameters as parameters related to resource mapping in a frequency domain.

- Number of PDSCH/PUSCH resource blocks (frequency bandwidth)
- Start position
- End position
- Information indicating whether to perform frequency hopping
- Information indicating a bandwidth part (BWP) and/or a component carrier (cell)

The parameter indicating the start position includes, for example, information indicating a first resource block number and/or subcarrier number of the PDSCHs/PUSCHs. In addition, the parameter indicating the end position includes, for example, information indicating a last resource block number and/or subcarrier number of the PDSCHs/PUSCHs.

[Parameter Related to Multi-Input Multi-Output (MIMO) or the Like]

The transmission parameters of the PDSCHs/PUSCHs may include the following parameters as parameters related to MIMO, pre-coding, and/or a beam.

- Parameter related to a transmission mode
- Parameter indicating the number of layers (number of ranks and number of spatial multiplexes) of MIMO
- Parameter indicating a matrix used for pre-coding
- Parameter indicating an antenna port used for transmission
- Parameter related to quasi co-location (QCL)

The parameter related to the transmission mode includes, for example, information related to a codebook-based or non-codebook-based transmission mode. In addition, the parameter indicating the antenna port used for transmission is also specifically used to specify a corresponding demodulation reference signal (DMRS). The parameter related to QCL is used to indicate whether the predetermined propagation path characteristics are the same.

[Parameter Related to Retransmission Control]

The transmission parameters of the PDSCHs/PUSCHs may include the following parameters as parameters related to hybrid automatic repeat request (HARQ) control (retransmission control).

- HARQ process number
- New data indicator
- Redundancy version

The HARQ process number is an identifier for managing a process of the retransmission control for data (codeword and transport block). The new data indicator is information indicating whether data corresponding to the HARQ process number is transmitted for the first time or retransmitted. The redundancy version is information indicating an encoded bit transmitted in the data corresponding to the HARQ process number.

[Other Parameters]

In addition to the parameters described above, the transmission parameters of the PDSCHs/PUSCHs may include the following parameters.

- Parameter related to a modulation method and/or an encoding rate
- Parameter related to a scrambling code used in the PDSCHs/PUSCHs
- Parameter related to transmission power control for the PDSCHs/PUSCHs
- Parameter indicating whether scheduled data is the PDSCHs or PUSCHs
- Parameter related to a channel access method specifically in a case where transmission and reception are performed on an unlicensed frequency or a shared frequency.
- Parameter related to priority (priority)
- Information indicating a PDSCH/PUSCH mapping type
- Information indicating the PDSCHs or PUSCHs The information indicating the PDSCH/PUSCH mapping type includes a type A, B, or C. That is, one PDCCH can schedule the plurality of PDSCHs/PUSCHs of different mapping types.

The information indicating the PDSCHs or the PUSCHs is information necessary in a case where the one PDCCH (described later) schedules the PDSCHs and the PUSCHs. Note that a PSSCH can be included in addition to or in place of any of the PDSCHs/PUSCHs.

Note that the above-described transmission parameters are examples, are not limitations. The transmission parameters of the PDSCHs/PUSCHs may include various kinds of information.

<3.3. Mapping Type>

As described above, in the conventional scheduling method, two different mapping types called a type A and a type B are prescribed as the PDSCH/PUSCH mapping types.

In the scheduling method according to the embodiment of the present disclosure, a PDSCH/PUSCH mapping type C (hereinafter, also referred to as a type C) can be newly defined in addition to the type A and the type B described above. The type C is a type suitable for use cases of the eMBB and the URLLC. For example, possible values of an SLIV of the type C may include all the possible values of the SLIVs of the type A and the type B. Furthermore, for example, in a case where scheduling can be performed across a plurality of slots in the scheduling method according to the embodiment of the present disclosure, the possible value of S of the SLIV of the type C may be 14 or more.

The terminal device 40 supporting transmission or reception of the PDSCH/PUSCH mapping type C may be configured to also support transmission or reception of the PDSCH/PUSCH mapping type B.

Note that in a case where the type C is not defined in the scheduling method according to the embodiment of the present disclosure, the scheduling method may be applied to the type A and the type B. Alternatively, the scheduling method may be applied to the type B and not applied to the type A. That is, the terminal device 40 that supports the scheduling method according to the embodiment of the present disclosure supports the PDSCH/PUSCH mapping type B. In other words, the terminal device 40 supporting the scheduling method according to the embodiment of the present disclosure supports highly-reliable and low-latency (URLLC) communication.

Furthermore, in the scheduling method according to the embodiment of the present disclosure, a format of the DCI (DCI format) used for scheduling may be newly defined. The DCI format is arranged in at least one slot (or symbol). The DCI format may include a transmission parameter for scheduling one or more PDSCHs and/or PUSCHs.

Hereinafter, the scheduling method according to the embodiment of the present disclosure will be described with some specific examples. However, some or all of these specific examples may be performed in combination with each other.

<3.4. Case of Single Carrier and Single Slot>

<3.4.1. PDSCH>

Figure 6:
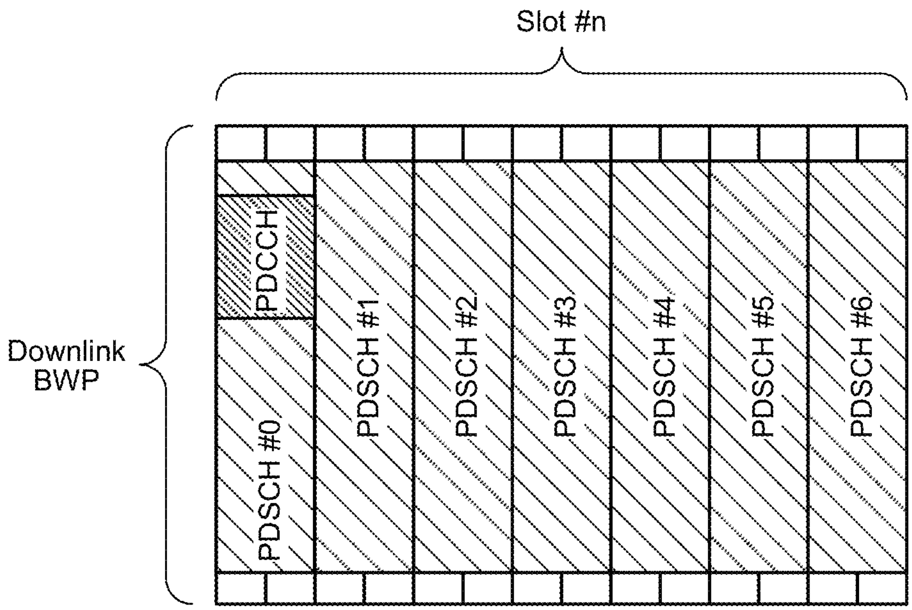
FIG. 6 is a view for describing an example of a scheduling method according to the embodiment of the present disclosure.
Figure 7:
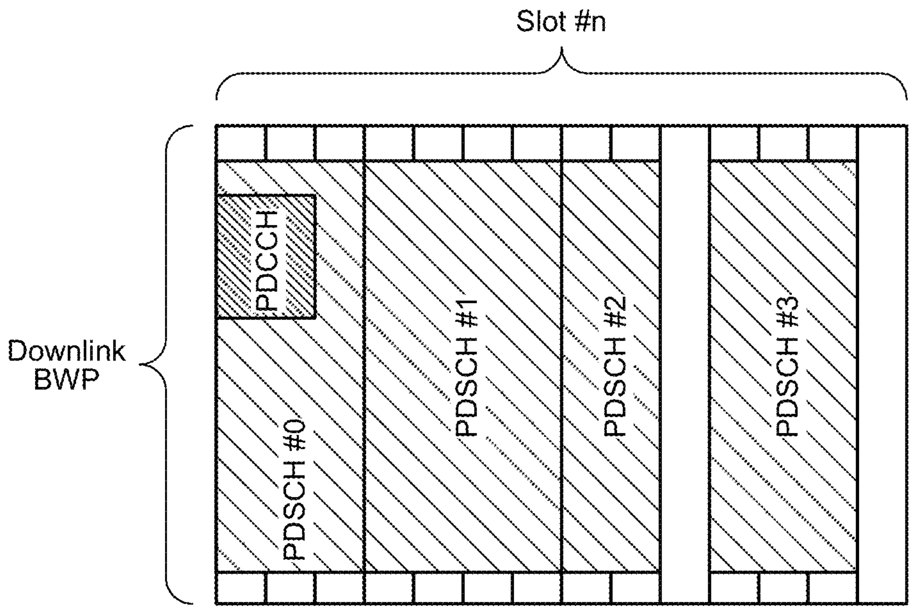
FIG. 7 is a view for describing an example of the scheduling method according to the embodiment of the present disclosure.

Here, an example in which one PDCCH schedules a plurality of PDSCHs in a predetermined slot (or symbol) in a case of single carrier and single slot will be described. FIG. 6 and FIG. 7 are views for describing examples of the scheduling method according to the embodiment of the present disclosure. Note that although scheduling is performed for a predetermined slot here, the scheduling method according to the embodiment of the present disclosure can also be applied to scheduling for an arbitrary time length (such as the predetermined number of symbols, subframes, radio frames, or the like).

A case where the number of symbols (time length) of scheduled PDSCHs is the same in a case of single carrier and single slot is illustrated in FIG. 6. That is, in the example of FIG. 6, a part of the transmission parameters (here, the number of symbols) is common in a plurality of PDSCHs scheduled by one PDCCH.

In FIG. 6, the PDCCH is included in a part of the PDSCH #0 and transmitted. The number of symbols of the plurality of PDSCHs #0 to #6 scheduled by the PDCCH is "2", and all have the same time length.

A case where the number of symbols (time length) of scheduled PDSCHs is respectively notified in a dedicated manner in a case of single carrier and single slot is illustrated in FIG. 7. That is, in the example of FIG. 7, a part of the transmission parameters (here, the number of symbols) is respectively notified in a dedicated manner in the plurality of PDSCHs scheduled by one PDCCH.

In FIG. 7, the PDCCH is included in a part of the PDSCH #0 and transmitted. The number of symbols of the plurality of PDSCHs #0 to #3 scheduled by the PDCCH is respectively set in a dedicated manner. For example, the number of symbols of the PDSCH #0 is "3", and the number of symbols of the PDSCH #1 is "4". The number of symbols of the PDSCH #2 is "2", and the number of symbols of the PDSCH #3 is "3". In such a manner, different symbol lengths may be respectively set for the plurality of PDSCHs #0 to #3.

Note that it may be prescribed in advance whether a part of the transmission parameters (such as the number of symbols) is common or notified in a dedicated manner. Alternatively, the base station device 20 may perform setting specifically for the cell 110 or specifically for the terminal device 40 through RRC signaling or the like.

Specific examples of the transmission parameters in the plurality of PDSCHs scheduled by the one PDCCH will be described in the following. At least one of the following transmission parameters may be transmitted from the base station device 20 to the terminal device 40 by RRC signaling (e.g., transmission in a manner of being included in the RRCReconfiguration message, the RRCSetup message, and the like), the PDCCH (e.g., DCI), or a combination thereof. Note that the scheduling method according to the embodiment of the present disclosure may be performed in a manner of including at least one of the following specific examples of the transmission parameters, and not all thereof are necessarily performed.

[Number of Symbols]

The number of symbols (time length) of the plurality of scheduled PDSCHs is the same.

As a result, even in a case where the plurality of PDSCHs is scheduled, the base station device 20 does not need to notify the symbol length of each of the PDSCHs in a dedicated manner, and an overhead of control information can be further reduced.

The base station device 20 may give notification of one value as the common number of symbols. The base station device 20 may notify the number of symbols by using DCI. Alternatively, the base station device 20 may set the number of symbols in advance by using RRC signaling or the like.

Note that the base station device 20 may notify the number of PDSCHs scheduled in a predetermined slot, a start symbol, or a frequency resource in a dedicated manner by the PDCCH.

[Frequency Resource]

Frequency resources (resource block numbers) of the plurality of scheduled PDSCHs are the same.

As a result, even in a case where the plurality of PDSCHs is scheduled, the base station device 20 does not need to give notification of the frequency resources of the PDSCHs in a dedicated manner, and the overhead of the control information can be further reduced.

The base station device 20 may give notification of one value as a common frequency resource. The base station device 20 may give notification of the frequency resource by using the DCI. Alternatively, the base station device 20 may set the frequency resource in advance by using RRC signaling or the like.

Frequency bandwidths (that is, the number of resource blocks) of the frequency resources of the scheduled plurality of PDSCHs are the same. On the other hand, positions (such as the start resource block number and the start subcarrier number) of the frequency resource to be mapped may vary depending on the plurality of PDSCHs.

For example, the base station device 20 may perform frequency hopping for each of the PDSCHs for the purpose of a frequency diversity effect. In this case, the base station device 20 gives notification of the frequency resource of the first PDSCH. The terminal device 40 determines the frequency resources of the subsequent PDSCHs on the basis of a prescribed method. Alternatively, the terminal device 40 may determine the frequency resources of the subsequent (second and subsequent) PDSCHs by a method set by RRC signaling.

[Start Symbol]

The start symbols of the plurality of scheduled PDSCH are notified in a bitmap format.

For example, information in a 14-bit bitmap format corresponding to each of 14 symbols in one slot (hereinafter, also referred to as bitmap information) is notified by DCI. For example, "1" of the bitmap information indicates a start symbol in which the PDSCH is scheduled. That is, as a result, the number of "1" included in the bitmap information represents the number of scheduled PDSCHs.

Specifically, in a case where the bitmap information is "01000100100000", three PDSCHs with the second, sixth, and ninth symbols in the slot as the start symbols are scheduled.

Note that the number of symbols of the scheduled PDSCHs may be notified (or set) separately from the bitmap information. At this time, the base station device 20 schedules the PDSCHs in such a manner that the plurality of PDSCHs do not overlap each other, and generates information (bitmap information) indicating the start symbols on the basis of the schedule.

In a case of receiving the bitmap information in which the plurality of PDSCHs is scheduled in an overlapping manner, the terminal device 40 recognizes that such a schedule is not set. In this case, the terminal device 40 recognizes that the plurality of PDSCHs is scheduled by a prescribed method.

For example, it is assumed that the terminal device 40 receives bitmap information of "01000100100000" although the number of symbols of the plurality of PDSCHs is set to the same "4". In this bitmap information, the second PDSCH and the third PDSCH overlap each other at the ninth symbol. In this case, the terminal device 40 recognizes that the PDSCHs are not scheduled on the basis of the bitmap information, and performs the reception processing by using the plurality of PDSCHs scheduled by the prescribed method.

[Time Domain Resource Assignment (TDRA) Table]

The start symbol and the number of symbols of each of the plurality of scheduled PDSCHs are notified by one TDRA table.

For example, a combination of values of a start symbol and the number of symbols of each of the scheduled PDSCHs is defined as one TDRA table. The start symbol and the number of symbols of each of the PDSCHs are designated by a value of time domain resource assignment included in the DCI. The values of the start symbol and the number of symbols of each of the PDSCHs may be defined by default or may be set by RRC signaling.

As a specific example, a TDRA table of a case where four PDSCHs are scheduled is illustrated in Table 3. Time domain resource assignment included in the DCI corresponds to a row index. For one row index, a combination of the start symbol (S) and the number of symbols (L) of each of the PDSCHs is defined.

TABLE 3

| Multi-PDSCH time domain resource allocation table | | | | | | | | |
|---|---|---|---|---|---|---|---|---|
| Row | PDSCH#0 | | PDSCH#1 | | PDSCH#2 | | PDSCH#3 | |
| index | S | L | S | L | S | L | S | L |
| 0 | 2 | 2 | 4 | 2 | 6 | 2 | 8 | 2 |
| 1 | 2 | 3 | 5 | 3 | 8 | 3 | 11 | 3 |
| 2 | 2 | 2 | 5 | 2 | 8 | 2 | 11 | 2 |
| 3 | 2 | 2 | 4 | 3 | 7 | 3 | 10 | 4 |
| 4 | 3 | 2 | 5 | 2 | 7 | 2 | 9 | 2 |
| 5 | 3 | 3 | 6 | 3 | 9 | 3 | 12 | 2 |
| 6 | 3 | 2 | 5 | 2 | 7 | 3 | 10 | 4 |
| 7 | 6 | 2 | 8 | 2 | 10 | 2 | 12 | 2 |

Note that K0 (offset between a slot of a PDCCH and a slot of a PDSCH) may be further set in each of the PDSCH. As a result, the base station device 20 can allocate the plurality of PDSCHs scheduled by one piece of DCI over slots.

Note that a period (time length, the number of slots, and the number of symbols) in which the combination notified by the DCI is valid may be notified by the DCI or RRC signaling.

Note that although a case where a plurality of combinations is defined or set is illustrated in the example of Table 3, only one combination may be defined or set. In this case, the base station device 20 does not need to notify the row index by the DCI. Furthermore, periodicity indicating a period (time length, the number of slots, and the number of symbols) is also defined or set, and repetitious application may be performed for each period.

Note that the values of S and L that can be set in each of the PDSCHs can be the same as those of the mapping type B.

[Demodulation Reference Signal (DMRS)]

A common DMRS may be associated with a plurality of PDSCHs scheduled by one PDCCH.

Figure 8:
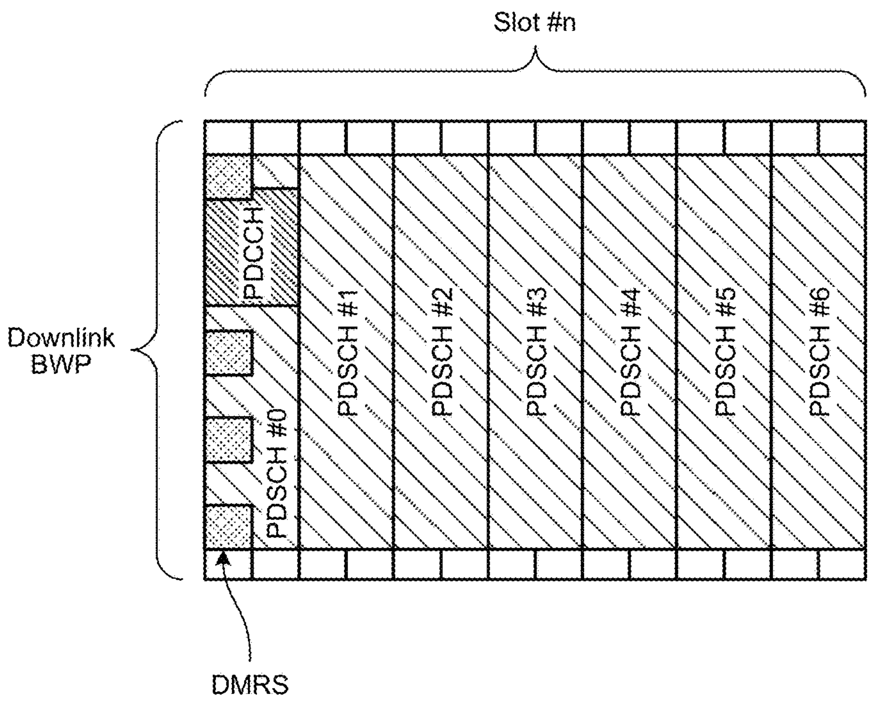
FIG. 8 is a view for describing an example of a DMRS arrangement according to the embodiment of the present disclosure.

FIG. 8 is a view for describing an example of a DMRS arrangement according to the embodiment of the present disclosure. In the example of FIG. 8, only a head PDSCH (PDSCH #0) among a plurality of PDSCHs scheduled by one PDCCH includes a DMRS, and subsequent PDSCHs (PDSCHs #1 to #6) do not include the DMRS. In this case, in the subsequent PDSCHs, the terminal device 40 performs demodulation by using the DMRS included in the head PDSCH. Note that all of the plurality of PDSCHs are preferably the same QCL in this case.

Figure 9:
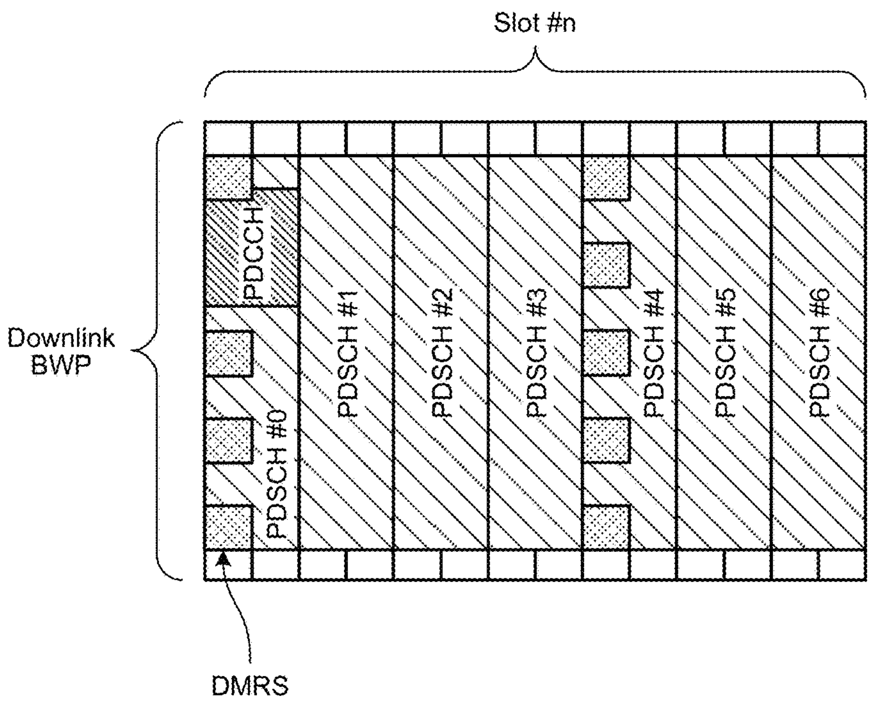
FIG. 9 is a view for describing another example of the DMRS arrangement according to the embodiment of the present disclosure.

FIG. 9 is a view for describing another example of the DMRS arrangement according to the embodiment of the present disclosure. Here, a PDSCH group including at least one PDSCH among the plurality of PDSCHs is allocated as a group to which a common DMRS is applied.

In the example of FIG. 9, two PDSCH groups that are a first group including the PDSCHs #0 to #3 and a second group including the PDSCHs #4 to #6 are set. The head PDSCH (PDSCH #0 and PDSCH #4) of each of the PDSCH groups includes the DMRS, and the other PDSCHs do not include the DMRS.

In this case, in the PDSCHs #1 to #3, the terminal device 40 performs demodulation by using the DMRS included in the PDSCH #0 at the head of the first group. In addition, in the PDSCHs #5 and #6, the terminal device 40 performs demodulation by using the DMRS included in the PDSCH #4 at the head of the second group.

Setting of the PDSCH groups (the number of PDSCHs in the group, and the number of groups), a DMRS arrangement symbol, and the like may be set by RRC signaling, or may be specified by DCI.

Note that different kinds of QCL may be designated in different PDSCH groups. A transmission configuration indicator (TCI) corresponding to each of the PDSCH groups may be notified in a dedicated manner. In addition, with respect to each DMRS, a common antenna port may be notified or an antenna port may be notified in a dedicated manner.

As described above, by using the common DMRS among the plurality of PDSCHs, the communication system 1 can reduce an overhead of the DMRS on a time axis.

<3.4.2. PUSCH>

Here, an example in which one PDCCH schedules a plurality of PUSCHs in a predetermined slot (or symbol) in a case of single carrier and single slot will be described. Note that although scheduling is performed for a predetermined slot here, the scheduling method according to the embodiment of the present disclosure can also be applied to scheduling for an arbitrary time length (such as the predetermined number of symbols, subframes, radio frames, or the like).

Figure 10:
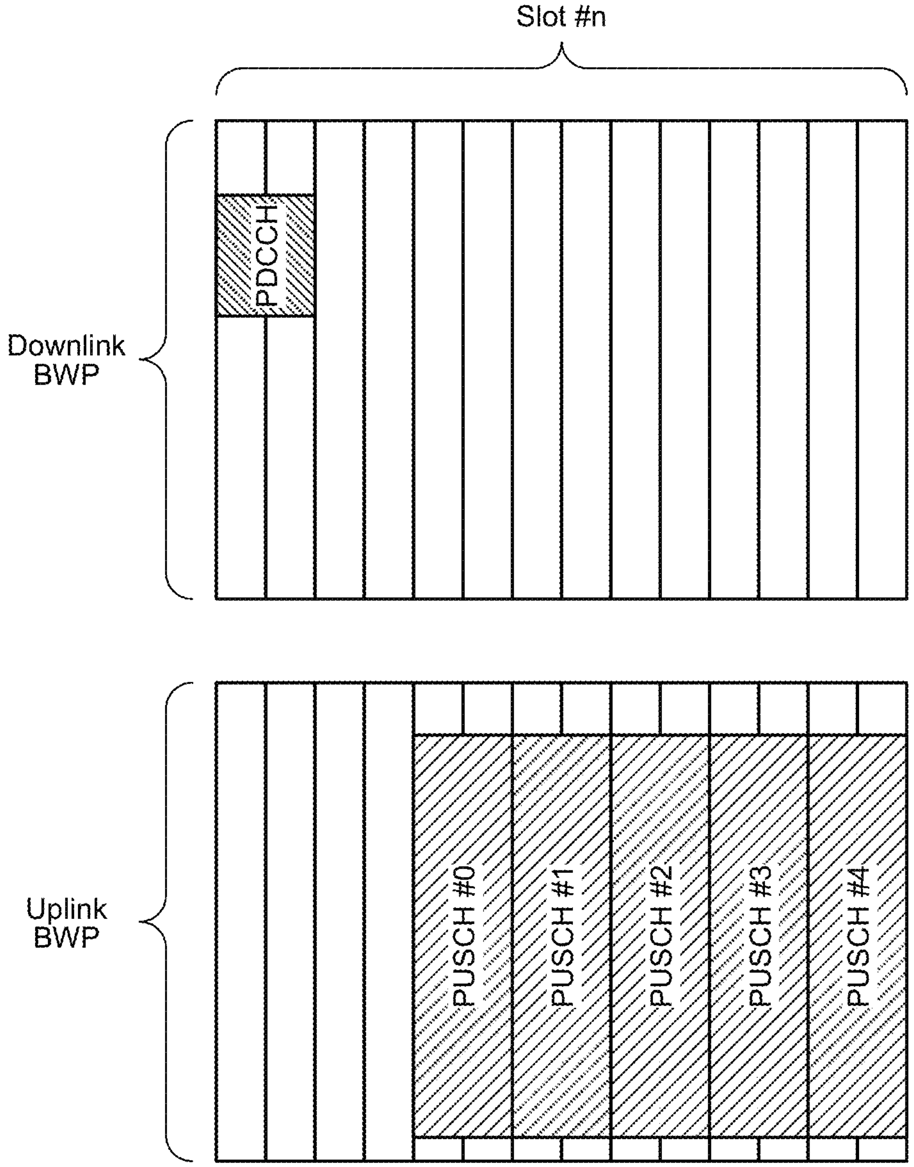
FIG. 10 is a view for describing another example of the scheduling method according to the embodiment of the present disclosure.
Figure 11:
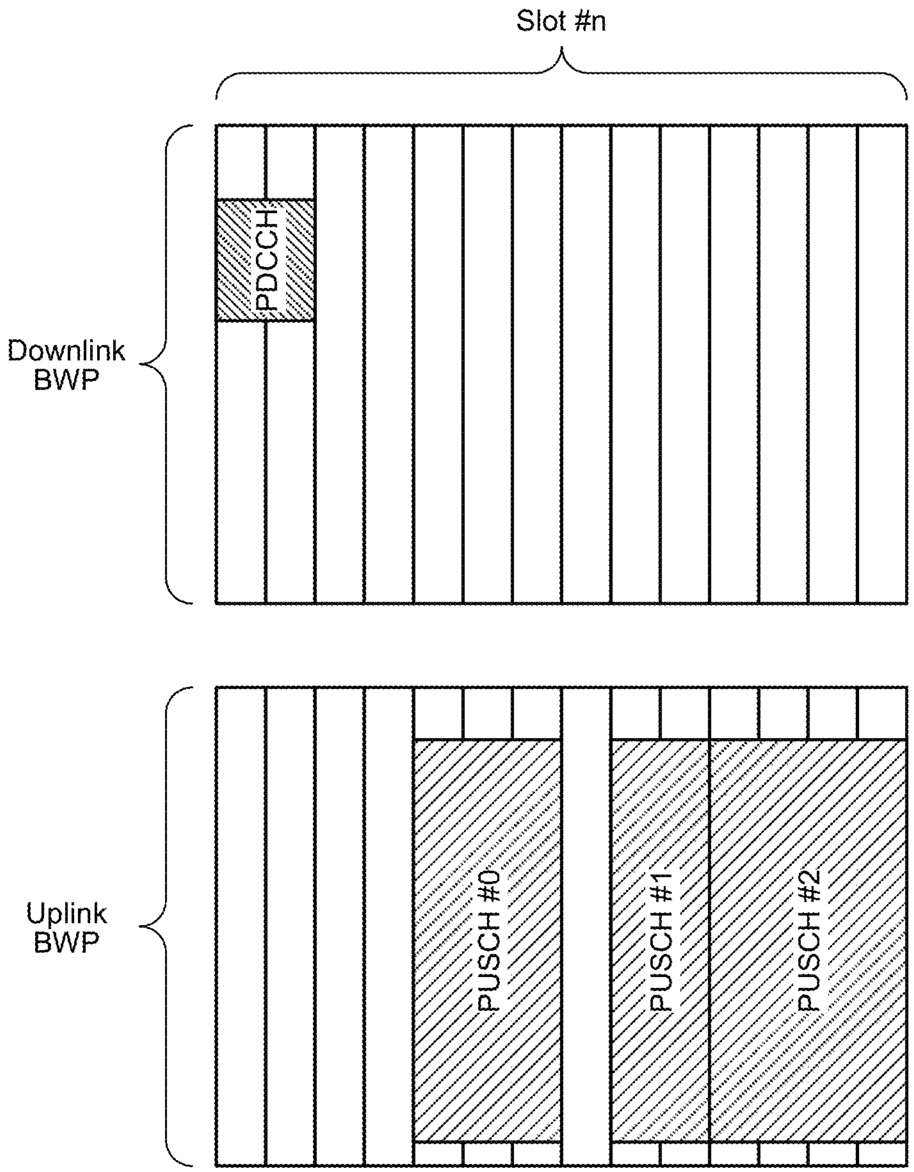
FIG. 11 is a view for describing another example of the scheduling method according to the embodiment of the present disclosure.

FIG. 10 and FIG. 11 are views for describing other examples of the scheduling method according to the embodiment of the present disclosure.

A case where the number of symbols (time length) of scheduled PUSCHs is the same in a case of single carrier and single slot is illustrated in FIG. 10. That is, in the example of FIG. 10, a part of transmission parameters (here, the number of symbols) is common in the plurality of PUSCHs scheduled by one PDCCH.

In FIG. 10, the PDCCH is arranged in first and second symbols of a downlink bandwidth part (BWP). PUSCHs #0 to #4 are scheduled in the fifth to fourteenth symbols of an uplink BWP by the PDCCH. The number of symbols of the PUSCHs #0 to #4 is “2”, and all have the same time length.

A case where the number of symbols (time length) of the PUSCHs to be scheduled is notified in a dedicated manner in a case of single carrier and single slot is illustrated in FIG. 11. That is, in the example of FIG. 11, a part of the transmission parameters (here, the number of symbols) is respectively notified in a dedicated manner in the plurality of PDSCHs scheduled by one PDCCH.

In FIG. 11, the PDCCH is arranged in the first and second symbols of the downlink bandwidth part (BWP). PUSCHs #0 to #2 are scheduled in the fifth to seventh and ninth to fourteenth symbols of the uplink BWP by the PDCCH. For example, the number of symbols of the PDSCH #0 is “3”, and the number of symbols of the PDSCH #1 is “2”. The number of symbols of the PDSCH #2 is “4”. In such manner, different symbol lengths may be respectively set for the plurality of PDSCHs #0 to #2.

In such a manner, the plurality of PUSCHs is scheduled by utilization of the one PDCCH similarly to the plurality of PDSCHs. Note that the specific examples of the transmission parameters applied to the plurality of PDSCHs described above may be similarly applied to the plurality of PUSCHs.

<3.5. Case of Multiple Slots>

In a case of multiple slots, an example in which one PDCCH schedules a plurality of PDSCHs or PUSCHs in a plurality of predetermined slots will be described.

Figure 12:
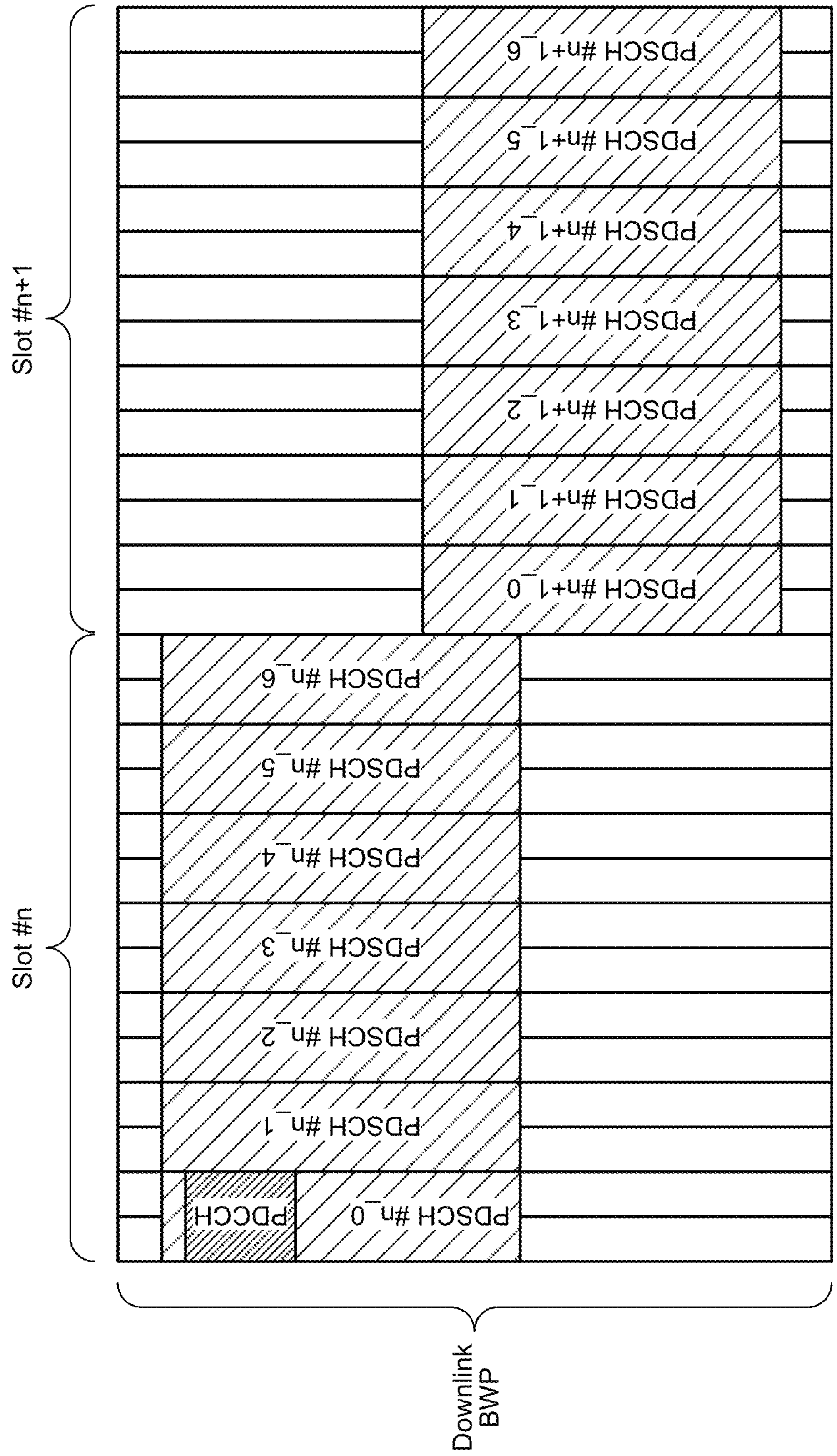
FIG. 12 is a view for describing an example of a scheduling method of a case of multiple slots according to the embodiment of the present disclosure.

FIG. 12 is a view for describing an example of a scheduling method of a case of multiple slots according to the embodiment of the present disclosure. A case where one PDCCH schedules a plurality of PDSCHs within a plurality of predetermined slots in a case of multiple slots is illustrated in FIG. 12.

In FIG. 12, the base station device 20 schedules a plurality of PDSCHs (PDSCHs #n_1 to #n_6, and #n+1_1 to #n+1_6) in two slots (Slots #n and #n+1) by using one PDCCH.

As described above, in a case of single slot, it may be prescribed in advance whether a part of the transmission parameters is common or notified in a dedicated manner. Alternatively, whether a part of the transmission parameters is common or notified in a dedicated manner may be set specifically for the cell 110 or specifically for the terminal device 40 through RRC signaling or the like.

Similarly, in a case of multiple slots, whether the transmission parameters are partially common or notified in a dedicated manner may be prescribed in advance or set through RRC signaling or the like.

Furthermore, in a case of multiple slots, the transmission parameters may be notified in a dedicated manner between slots. For example, in the example of FIG. 12, frequency resources are notified in a dedicated manner between slots. Thus, although the frequency resources of the PDSCHs are common in each of the slots, the frequency resources vary between the slots.

Figure 13:
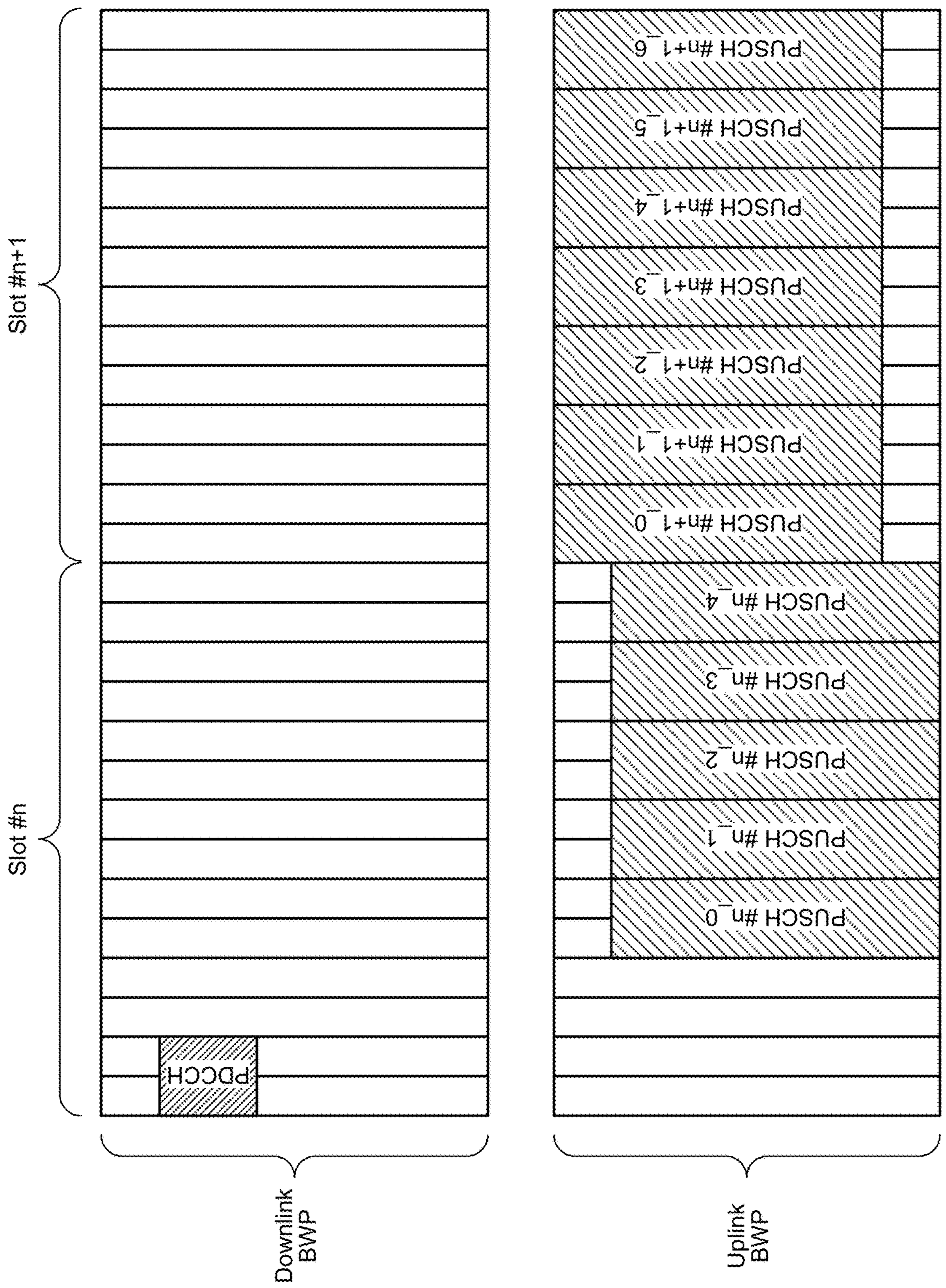
FIG. 13 is a view for describing an example of the scheduling method of a case of multiple slots according to the embodiment of the present disclosure.

FIG. 13 is a view for describing an example of the scheduling method of a case of multiple slots according to the embodiment of the present disclosure. A case where one PDCCH schedules a plurality of PUSCHs within a plurality of predetermined slots in a case of multiple slots is illustrated in FIG. 13.

In FIG. 13, the base station device 20 schedules a plurality of PUSCHs (PUSCHs #n_1 to #n_4 and #n+1_1 to #n+1_6) in two slots (Slots #n and #n+1) of the uplink BWP by using one PDCCH.

Note that in a case where a plurality of PUSCHs is scheduled, similarly to the PDSCHs, whether the transmission parameters are partially common or notified in a dedicated manner may be prescribed in advance, or set through RRC signaling or the like.

Furthermore, in a case where a plurality of PUSCHs is scheduled, similarly to the PDSCHs, the transmission parameters may be notified in a dedicated manner between slots. For example, in the example of FIG. 13, frequency resources are notified in a dedicated manner between slots. Thus, although the frequency resources of the PDSCHs are common in each of the slots, the frequency resources vary between the slots.

As described above, the communication system 1 according to the embodiment of the present disclosure may determine, for each predetermined time length, whether transmission parameters of a plurality of PDSCHs (or PUSCHs) scheduled by one PDCCH are common.

Note that the predetermined time length may be a time length prescribed in advance, such as one or a plurality of OFDM symbols, a slot including 14 OFDM symbols, a subframe (1 ms), a half frame (5 ms), a system frame (10 ms), or the like. Alternatively, the predetermined time length may be set specifically for the cell 110 or specifically for the terminal device 40 through RRC signaling or the like.

<3.6. Case of Multiple Carriers>

As an example of multiple carriers, an example in which one PDCCH schedules a plurality of PDSCHs or PUSCHs in a plurality of predetermined component carriers (cell, BWP, and arbitrary frequency domain) in a case where carrier aggregation is set in a certain terminal device 40 will be described. Note that a case where one PDCCH schedules a plurality of PDSCHs will be described in the following. In a case where one PDCCH schedules a plurality of PUSCHs, scheduling may be performed in a manner similar to the PDSCHs, whereby description thereof is omitted here.

Figure 14:
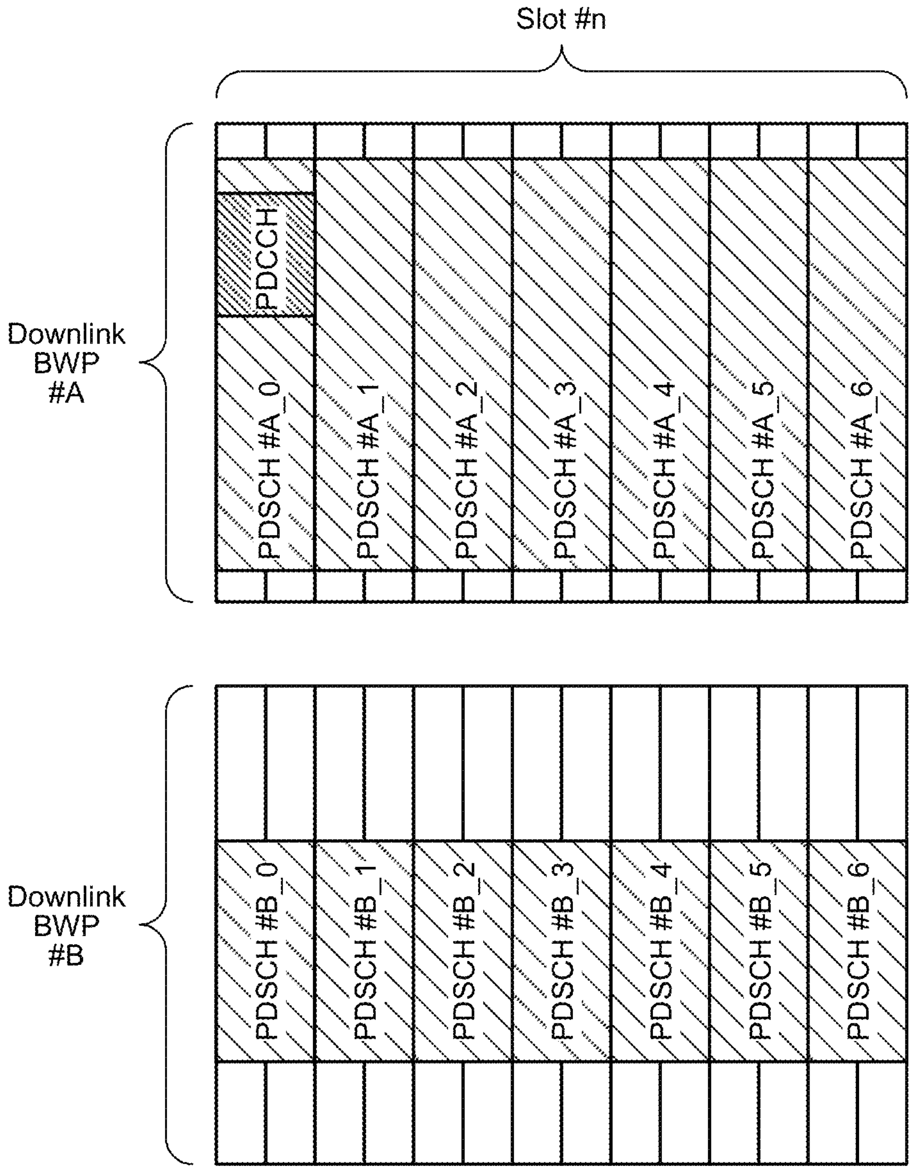
FIG. 14 is a view for describing an example of a scheduling method of a case of multiple carriers according to the embodiment of the present disclosure.

FIG. 14 is a view for describing an example of the scheduling method of a case of multiple carriers according to the embodiment of the present disclosure. A case where a plurality of BWPs is set in the terminal device 40 is illustrated in FIG. 14 as an example of multicarrier transmission.

In FIG. 14, one PDCCH schedules all PDSCHs in two BWPs (downlink BWPs #A and #B) in a predetermined slot.

As described above, in a case of single slot, it may be prescribed in advance whether a part of the transmission parameters is common or notified in a dedicated manner. Alternatively, whether a part of the transmission parameters is common or notified in a dedicated manner may be set specifically for the cell 110 or specifically for the terminal device 40 through RRC signaling or the like.

Similarly, in a case of multiple carriers, whether the transmission parameters are partially common or notified in a dedicated manner may be prescribed in advance or set through RRC signaling or the like.

Furthermore, in a case of multiple carriers, the transmission parameters may be notified specifically between the BWPs. For example, in the example of FIG. 14, the frequency domain resource mapping (such as frequency bandwidths) of the PDSCHs is notified specifically between the BWPs. Thus, although the frequency bandwidths of the PDSCHs is common within each of the BWPs, the frequency bandwidths vary between the BWPs.

As described above, in the example of FIG. 14, the transmission parameters related to the frequency domain resource mapping (such as frequency bandwidth) of the PDSCH are notified or set specifically between the plurality of BWPs. On the other hand, the transmission parameter related to the resource mapping in the time domain (such as the number of symbols) of the PDSCHs is notified or set in common between the plurality of BWPs.

As described above, in the example of FIG. 14, the communication system 1 may determine whether the transmission parameters of the plurality of PDSCHs (or PUSCHs) scheduled by the one PDCCH are common for each of the predetermined frequency bandwidths.

Note that examples of the predetermined frequency bandwidths include a component carrier, a BWP, one or a predetermined resource block, one or a predetermined number of subcarriers, and the like.

Note that even in a case where the transmission parameters of the PDSCHs are notified specifically for each of the BWPs, values of the transmission parameters may be associated between the BWPs. As a result, the communication system 1 can reduce the number of bits required for notification of the transmission parameters.

A specific example is an MCS. The same level of SINRs may be assumed even at different frequencies. Thus, for example, the base station device 20 notifies an MCS in a BWP #1 as 5-bit information, and notifies an MCS in a BWP #2 as a difference from the MCS in the BWP #1. As a result, the base station device 20 can reduce the number of bits of the MCSs in and after the BWP #2.

Figure 15:
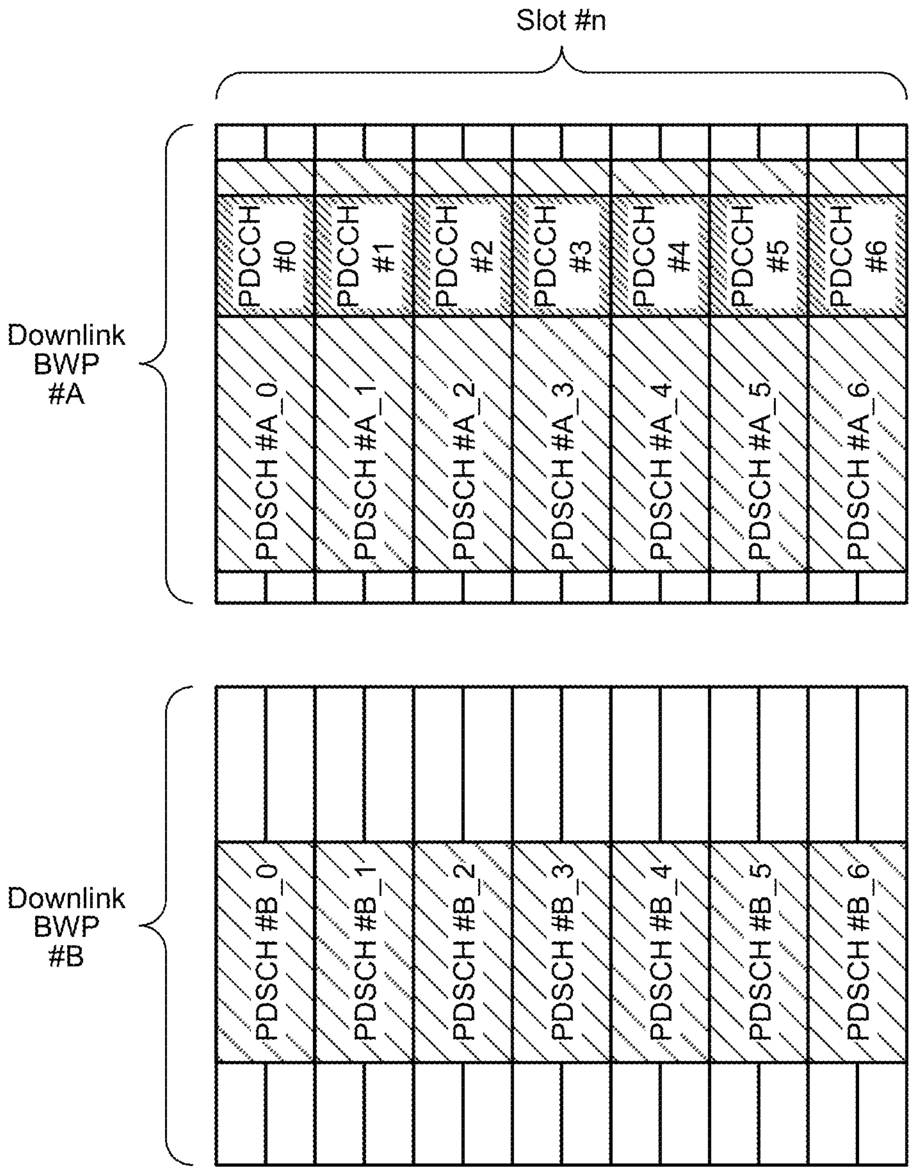
FIG. 15 is a view for describing another example of the scheduling method of a case of multiple carriers according to the embodiment of the present disclosure.

FIG. 15 is a view for describing another example of the scheduling method of a case of multiple carriers according to the embodiment of the present disclosure. A case where a plurality of BWPs is set in the terminal device 40 as an example of multicarrier transmission is illustrated in FIG. 15.

Here, one PDCCH schedules one PDSCH for each of the two BWPs (downlink BWPs #A and #B) in a predetermined slot.

In the example of FIG. 15, the base station device 20 transmits scheduling information of a PDSCH #A_0 and a PDSCH #B_0 by a PDCCH #0. In addition, the base station device 20 transmits scheduling information of a PDSCH #A_1 and a PDSCH #B_1 by a PDCCH #1.

In the example of FIG. 15, the number of symbols and start symbol positions of the PDSCHs to be scheduled are common between the BWPs #A and #B. For example, the PDSCH #A_0 and the PDSCH #B_0 scheduled by the PDCCH #0 have the same number of symbols. In addition, the start symbol positions of the PDSCH #A_0 and the PDSCH #B_0 are the same.

In such a manner, since the number of symbols and the start symbol positions of the PDSCHs to be scheduled are common between the BWPs #A and #B, the base station device 20 does not need to notify the terminal device 40 of the number of symbols and the start symbol position. As a result, the base station device 20 can further improve the frequency utilization efficiency.

Figure 16:
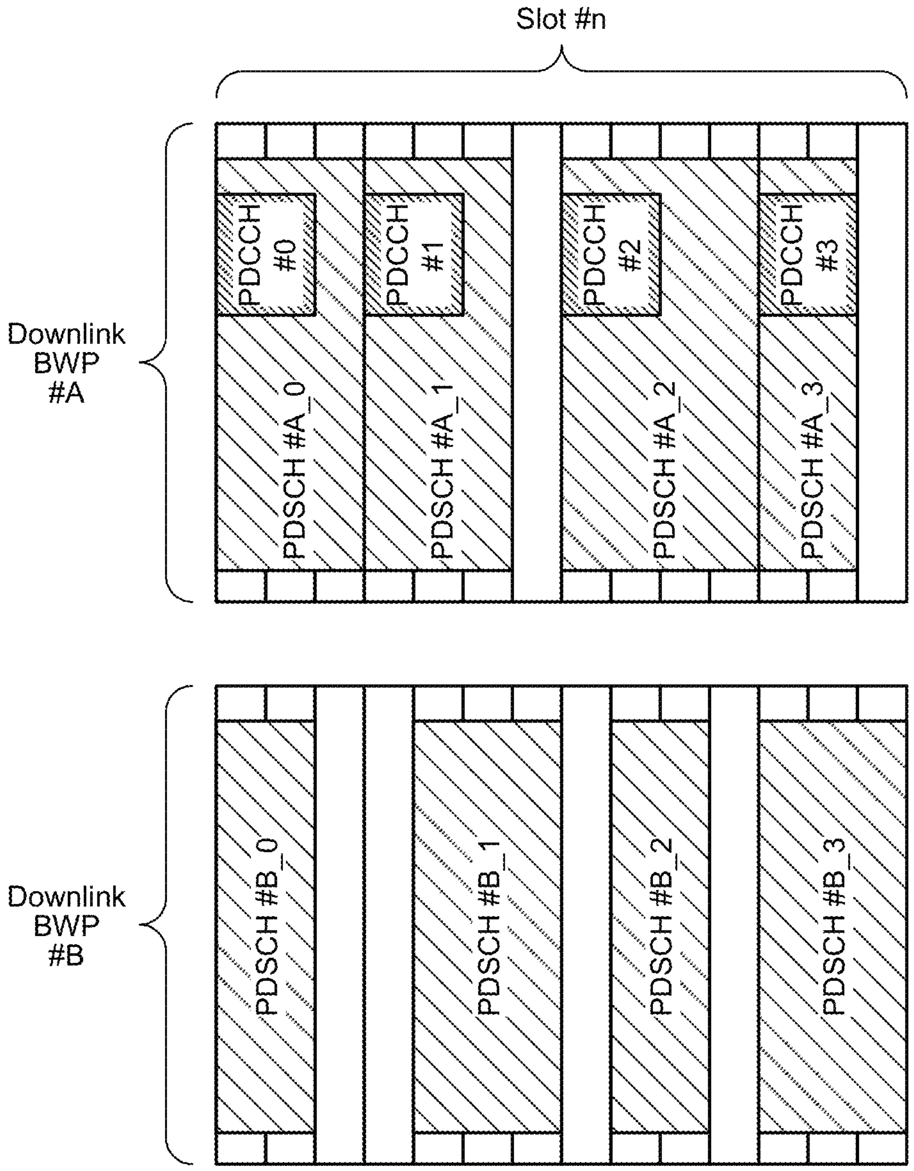
FIG. 16 is a view for describing another example of the scheduling method of a case of multiple carriers according to the embodiment of the present disclosure.

Note that the number of symbols and the start symbol position of the PDSCHs to be scheduled may be notified specifically in each of the BWPs #A and #B. FIG. 16 is a view for describing another example of the scheduling method of a case of multiple carriers according to the embodiment of the present disclosure. A case where a plurality of BWPs is set in the terminal device 40 is illustrated in FIG. 16 as an example of multicarrier transmission.

In the example of FIG. 16, the number of symbols and the start symbol position of the PDSCHs to be scheduled are notified specifically in each of the BWPs #A and #B. For example, the number of symbols of a PDSCH #A_2 scheduled by a PDCCH #2 is "4", and the number of symbols of a PDSCH #B_2 is "2". In addition, a start symbol position of the PDSCH #A_2 scheduled by the PDCCH #2 is the eighth position, and a start symbol position of the PDSCH #B_2 is the ninth position.

At this time, a start symbol position of a PDSCH may be limited to be at or after a start symbol position of a PDCCH that schedules the PDSCH. In other words, the terminal device 40 assumes that the start symbol position of the PDSCH is not scheduled before the start symbol position of the PDCCH that schedules the PDSCH.

Note that the start symbol position of the PDSCH may be notified by information indicating a relative position (offset) with respect to a position of a predetermined symbol (such as a start symbol position) of the PDCCH that schedules the PDSCH.

For example, position information indicating the relative position includes two bits. The position information indicates an offset value (such as any of symbols 0, 1, 2, and 3). Furthermore, the number of bits (such as two bits) and/or a possible offset value (such as the symbol 0, 1, 2, or 3) may be set by RRC signaling or the like.

Note that although a case of single slot has been described in the above-described example, the communication system 1 may perform scheduling of a plurality of PDSCHs (PUSCHs) by using one PDCCH in multiple carriers also in a case of multiple slots.

<3.7. Case of Time Division Duplex (TDD)>

In a case where one PDCCH as described above schedules a plurality of PDSCHs or PUSCHs, the PDSCHs or PUSCHs is further scheduled on the basis of a slot format.

Here, in the slot format, a downlink symbol, an uplink symbol, or a flexible symbol may be set for each OFDM symbol. Note that the flexible symbol is a symbol that can be a downlink symbol or an uplink symbol by other signaling.

Note that the slot format may include a sidelink symbol used for direct communication between devices. Furthermore, the slot format is notified by RRC signaling specific to the cell 110, RRC signaling specific to the terminal device 40, and signaling of a physical layer (e.g., DCI carried by a PDCCH or a PDCCH).

Figure 17:
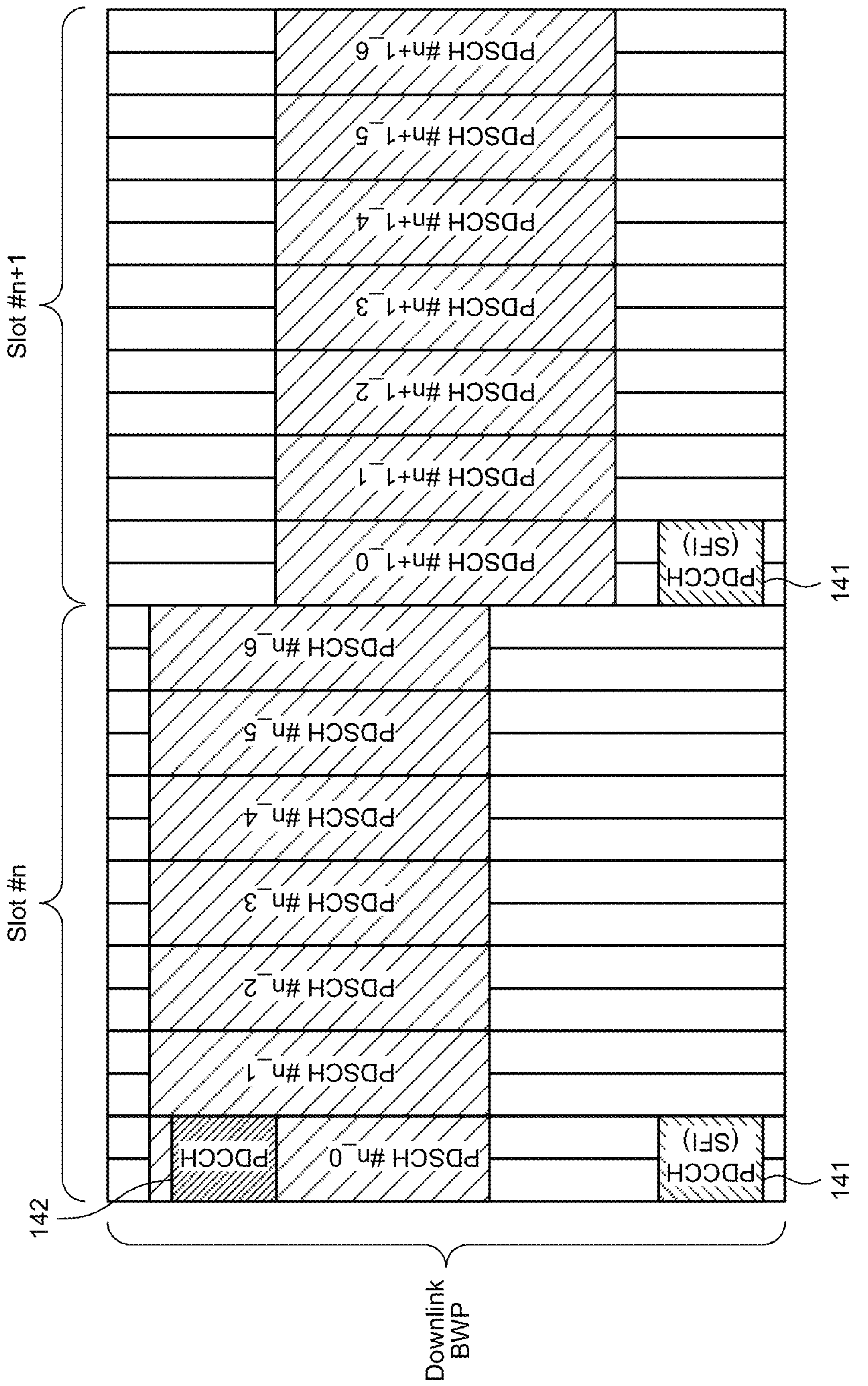
FIG. 17 is a view for describing an example of a scheduling method of a case of TDD according to the embodiment of the present disclosure.

FIG. 17 is a view for describing an example of a scheduling method of a case of TDD according to the embodiment of the present disclosure. In the scheduling method illustrated in FIG. 17, the base station device 20 gives notification of a second PDCCH 142 in addition to a first PDCCH 141.

Note that the first PDCCH 141 is the same as the one PDCCH described above, and is used to be directed to one terminal device 40. A plurality of PDSCHs or PUSCHs is scheduled by the first PDCCH 141.

In addition, the second PDCCH 142 is used for notification of information indicating the slot format (slot format indicator (SFI)). The second PDCCH 142 may be used to be directed to a plurality of the terminal devices 40.

Whether the PDSCHs or PUSCHs scheduled by the first PDCCH 141 are eventually used for transmission is determined on the basis of the slot format notified (or set) by the second PDCCH 142.

For example, the PDSCHs scheduled by the first PDCCH 141 are used for signal transmission in a case where the slot format notified (or set) by another signaling (second PDCCH 142) is a downlink symbol.

Furthermore, in a case where a part of symbols to which the PDSCHs may be mapped is not the downlink symbol (is the uplink symbol, for example), the PDSCHs may not be used for signal transmission. In a case where the symbols to which the PDSCHs may be mapped are the downlink symbols or the flexible symbols (are not the uplink symbols, for example), the PDSCHs may be used for signal transmission.

For example, the PUSCHs scheduled by the first PDCCH 141 are used for signal transmission in a case where the slot format notified (or set) by another signaling (second PDCCH 142) is the uplink symbol.

Furthermore, in a case where a part of symbols to which the PUSCHs may be mapped is not the uplink symbol (is the downlink symbol, for example), the PUSCHs may not be used for signal transmission. In a case where the symbols to which the PUSCHs may be mapped are the uplink symbols or the flexible symbols (are not the downlink symbols, for example), the PUSCHs may be used for signal transmission.

Note that the slot format notified by the SFI after the first PDCCH 141 is received may not contradict the PDSCHs or PUSCHs scheduled by the first PDCCH 141. That is, in a case where the PDSCHs are scheduled by the first PDCCH 141, the terminal device 40 assumes that the symbols to which the PDSCHs are mapped are not notified as uplinks by the SFI. Furthermore, in a case where the PUSCHs are scheduled by the PDCCH, the terminal device 40 assumes that the symbols to which the PUSCHs are mapped are not notified as downlinks by the SFI.

<3.8. Scheduling by Dual DCI>

Although it is assumed in the above example that one PDCCH includes one piece of DCI, this is not a limitation. For example, DCI transmitted by a PDCCH to schedule a plurality of PDSCHs is divided into two. A part of the DCI (first DCI) is notified by the PDCCH as described above, and the other part (at least a part of the remaining part) of the DCI (second DCI) is mapped in each of the PDSCHs. The terminal device 40 can receive signals with the plurality of scheduled PDSCHs by receiving the two pieces of DCI.

Figure 18:
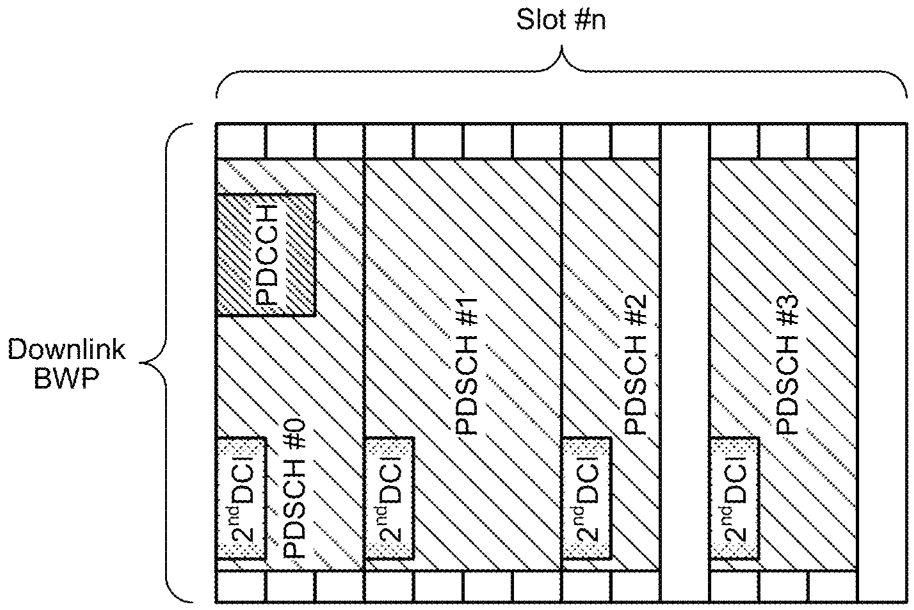
FIG. 18 is a view for describing an example of a scheduling method by dual DCI according to the embodiment of the present disclosure.

FIG. 18 is a view for describing an example of a scheduling method by dual DCI according to the embodiment of the present disclosure.

The first DCI is notified by a PDCCH illustrated in FIG. 18. The first DCI may include a transmission parameter commonly used by scheduled PDSCHs and resource mapping information in a time domain and/or a frequency domain of the scheduled PDSCHs.

The second DCI is mapped to a predetermined resource in each of the PDSCHs. The second DCI may include a transmission parameter specific to the PDSCH to which the second DCI is mapped.

The predetermined resource to which the second DCI is mapped is a relative position in the PDSCH. For example, a time domain of the predetermined resource is a first symbol in the PDSCH. Furthermore, for example, a frequency domain of the predetermined resource is mapped from a first resource block in the PDSCH.

As described above, the base station device 20 divides the DCI into the first DCI and the second DCI and performs transmission thereof, whereby the base station device 20 can further reduce an overhead of the PDCCH that transmits the first DCI. Furthermore, the base station device 20 can flexibly set a transmission parameter specific to each of the PDSCHs by using the second DCI.

Note that the dual DCI (first and second DCI) can be applied to a case of multiple slots and/or a case of multiple carriers described above.

Figure 19:
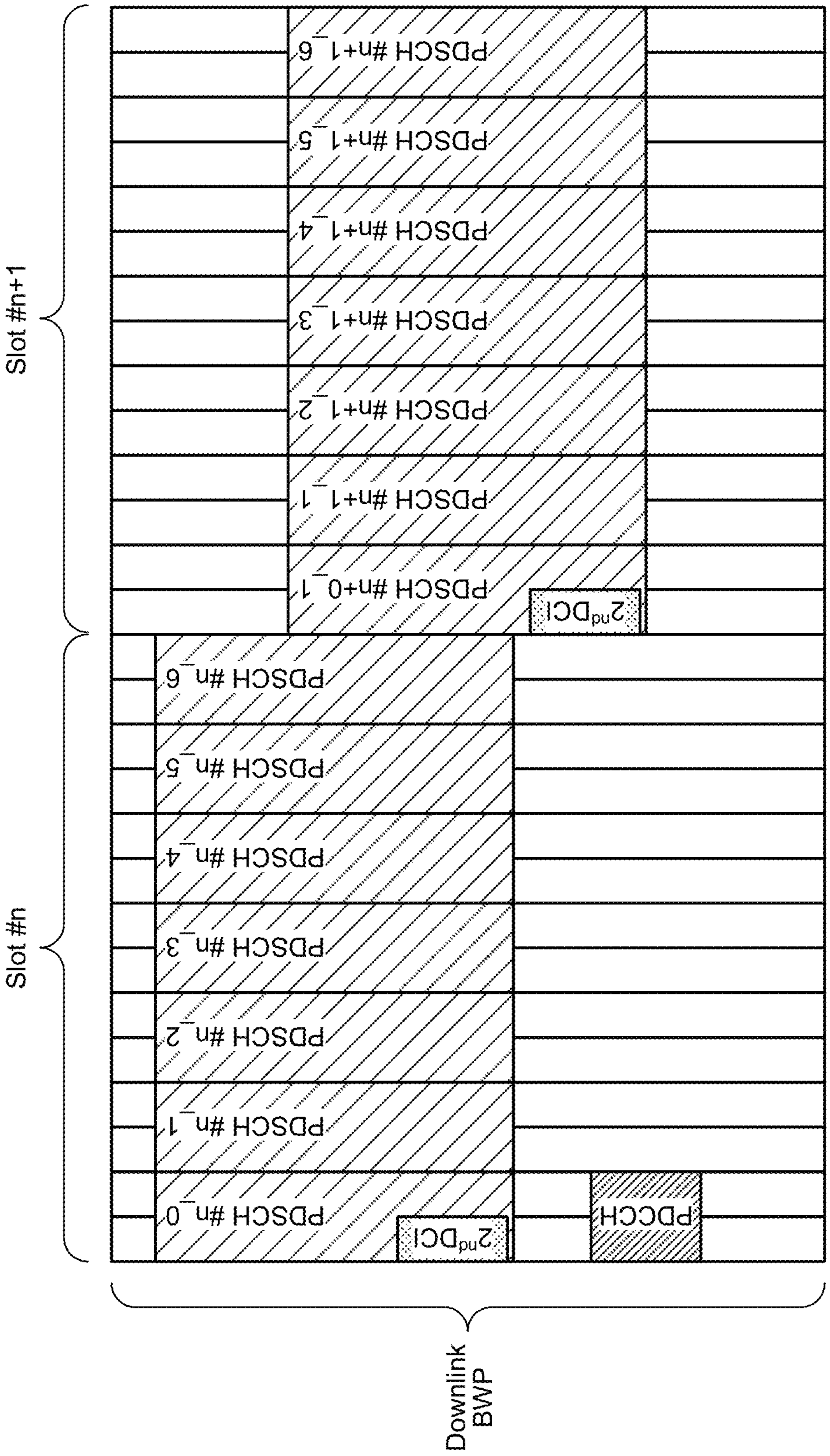
FIG. 19 is a view for describing an example of a scheduling method, in which dual DCI is applied to multiple slots, according to the embodiment of the present disclosure.

FIG. 19 is a view for describing an example of a scheduling method, in which dual DCI is applied to multiple slots, according to the embodiment of the present disclosure.

The first DCI is notified by a PDCCH illustrated in FIG. 19. Note that although being arranged in a resource block different from a PDSCH #0 in FIG. 19, the PDCCH may be arranged in a part of a PDSCH #0 as in FIG. 12. A first DCI gives notification of transmission parameters of all PDSCHs #n_0 to #n_6 and #n+1_0 to #n+1_6 in a plurality of slots.

A second DCI is mapped to a predetermined resource in a head PDSCH of each of the slots (PDSCHs #n_0 and #n+1_0). The second DCI mapped to the PDSCH #n_0 gives notification of the transmission parameters of the plurality of PDSCHs #n_0 to #n_6 in the slot #n. The second DCI mapped to the PDSCH #n+1_0 gives notification of the transmission parameters of the plurality of PDSCHs #n+1_0 to #n+1_6 in the slot #n+1.

The first DCI gives notification of the transmission parameters of the plurality of PDSCHs in the plurality of slots, and the second DCI gives notification of the transmission parameters of the plurality of PDSCHs in each of the slots. In other words, the first DCI and the second DCI have different kinds of granularity (transmission frequencies) in a time direction of the scheduled PDSCHs.

Figure 20:
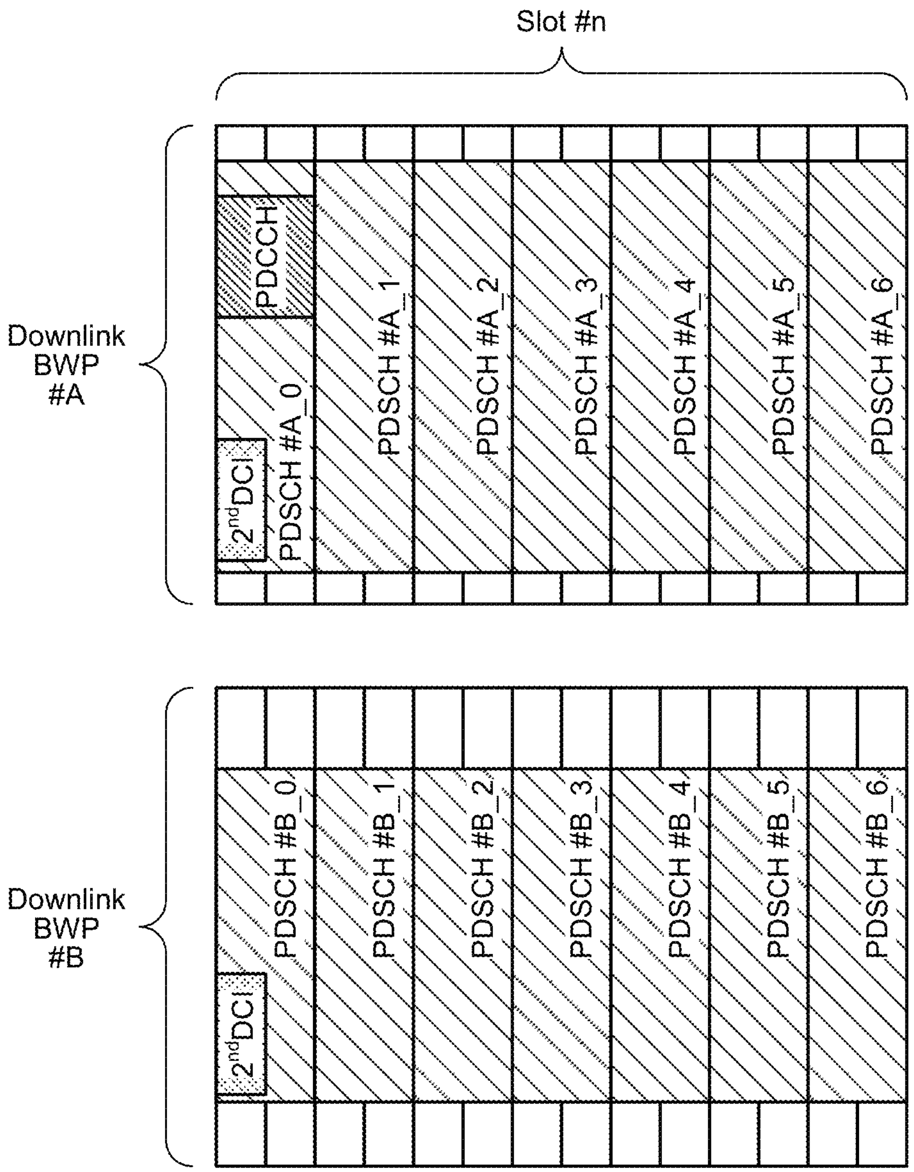
FIG. 20 is a view for describing an example of a scheduling method, in which dual DCI is applied to multiple carriers, according to the embodiment of the present disclosure.

FIG. 20 is a view for describing an example of a scheduling method, in which dual DCI is applied to multiple carriers, according to the embodiment of the present disclosure.

A first DCI is notified by a PDCCH illustrated in FIG. 20. The first DCI notifies transmission parameters of all PDSCHs #A_0 to #A_6 and #B_0 to #B_6 in a plurality of BWPs #A and #B.

A second DCI is mapped to a predetermined resource in a head PDSCH of each of the BWPs #A and #B (PDSCHs #A_0 and #B_0). The second DCI mapped to the PDSCH #A_0 gives notification of the transmission parameters of the plurality of PDSCHs #A_0 to #A_6 in the BWP #A. The second DCI mapped to the PDSCH #B_0 gives notification of the transmission parameters of the plurality of PDSCHS #B_0 to #B_6 in the BWP #B.

The first DCI gives notification of the transmission parameters of the plurality of PDSCHs in the plurality of BWPs, and the second DCI gives notification of the transmission parameters of the plurality of PDSCHs in each of the BWPs. In other words, the first DCI and the second DCI have different kinds of granularity in a frequency direction of the scheduled PDSCHs.

Figure 21:
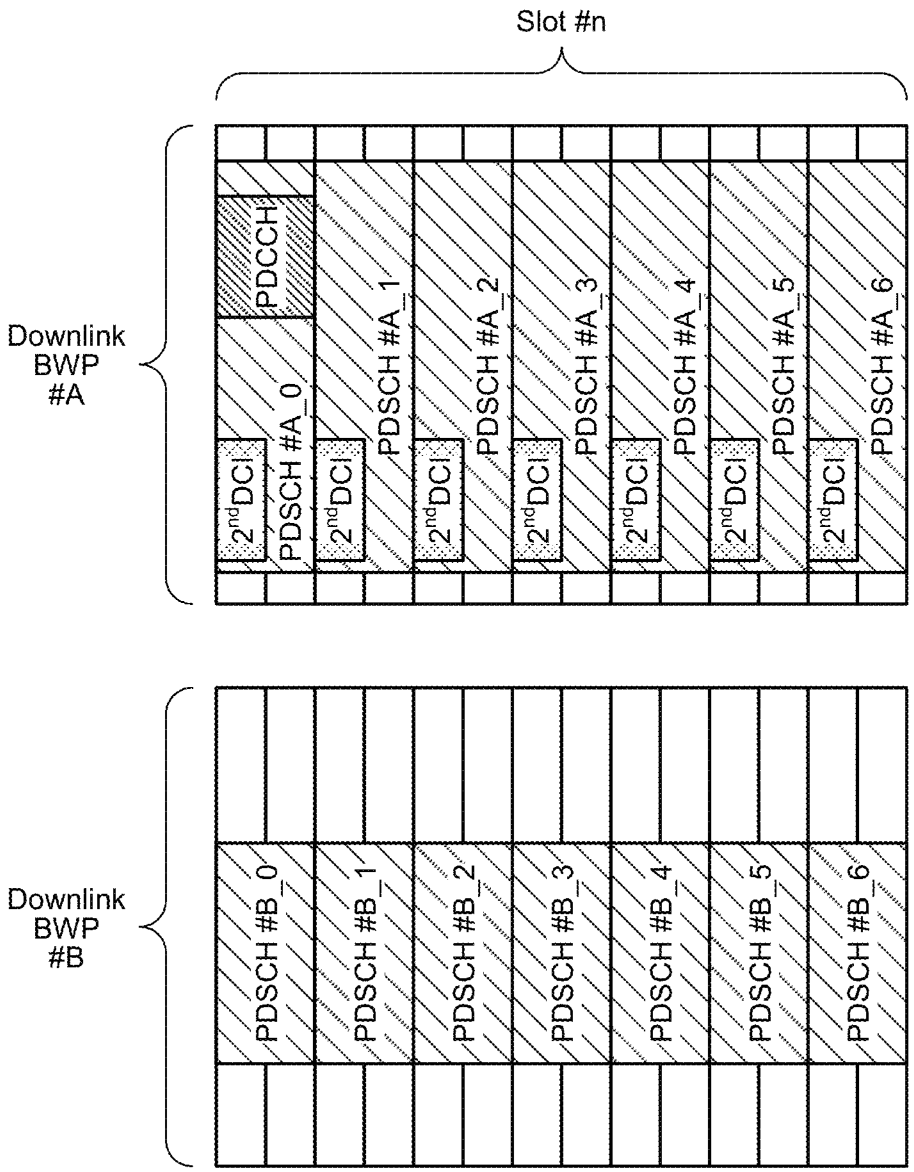
FIG. 21 is a view for describing another example of the scheduling method, in which dual DCI is applied to multiple carriers, according to the embodiment of the present disclosure.

FIG. 21 is a view for describing another example of the scheduling method, in which dual DCI is applied to multiple carriers, according to the embodiment of the present disclosure.

A first DCI is notified by a PDCCH illustrated in FIG. 21. The first DCI notifies transmission parameters of all PDSCHs #A_0 to #A_6 and #B_0 to #B_6 in a plurality of BWPs #A and #B.

The second DCI is mapped to a predetermined resource in each of the PDSCHs of the BWP #A (PDSCHS #A_0 to #A_6). The second DCI mapped to the PDSCH #A_0 gives notification of the transmission parameters of the PDSCH #A_0 and the corresponding PDSCH #B_0 in the BWP #B. At this time, the plurality of PDSCHs scheduled by the second DCI may be limited in such a manner that at least one OFDM symbol overlaps.

In such a manner, the second DCI is mapped to a PDSCH in at least one frequency band (such as the BWP #A) of a plurality of frequency bands (such as the BWPs #A and #B). The second DCI gives notification of transmission parameters of one or more PDSCHs corresponding to the PDSCH and arranged in a plurality of frequency bands.

Specific examples of the first DCI and the second DCI will be described.

The first DCI gives notification of a start symbol position of each of the PDSCHs. The second DCI gives notification of the number of symbols or an end symbol position of the PDSCH.

The first DCI gives notification of the number of layers (number of spatial multiplexes and number of ranks) of MIMO and/or information related to a beam as a transmission parameter common to the plurality of PDSCHS. The second DCI gives notification of information indicating a modulation method and/or an encoding rate (such as an MCS number and a redundancy version number) of the PDSCHs.

The first DCI gives notification of resource mapping information in a frequency domain as a transmission parameter common to the plurality of PDSCHs.

Specifically, in a case of multiple slots (see, for example, FIG. 19), the first DCI may give notification of transmission parameters for the plurality of PDSCHs in the plurality of slots. For example, the first DCI gives notification of a common transmission parameter in each slot. For example, the first DCI includes resource mapping information in a frequency domain of the PDSCHs in each slot.

Specifically, in a case of multiple slots (see, for example, FIG. 19), the second DCI may give notification of transmission parameters for the plurality of PDSCHs in each slot. For example, the second DCI can give notification of a transmission parameter specific to each PDSCH in each slot. The second DCI includes resource mapping information in a time domain of the PDSCHs in each slot.

Specifically, in a case of multiple carriers (see, for example, FIG. 20), the first DCI may give notification of a transmission parameter for the plurality of PDSCHs in the plurality of BWPs. For example, the first DCI gives notification of a common transmission parameter in each BWP. For example, the first DCI includes resource mapping information in a frequency domain of the PDSCHs in each slot.

Specifically, in a case of multiple carriers (see, for example, FIG. 20), the second DCI may give notification of transmission parameters for the plurality of PDSCHs in each BWP. For example, the second DCI gives notification of a transmission parameter specific to each PDSCH in each BWP. The second DCI includes resource mapping information in a frequency domain of the PDSCHs in each BWP.

Specifically, in a case of multiple carriers (see, for example, FIG. 21), the first DCI may give notification of transmission parameters for the plurality of PDSCHs in the plurality of BWPs. For example, the first DCI gives notification of a common transmission parameter in each BWP. For example, the first DCI includes resource mapping information in a frequency domain of the PDSCHs in each slot.

Specifically, in a case of multiple carriers (see, for example, FIG. 21), the second DCI may give notification of transmission parameters for the plurality of PDSCHs corresponding across the plurality of BWPs. For example, the second DCI gives notification of a transmission parameter specific to each of the PDSCHS corresponding across the plurality of BWPs. The second DCI includes resource mapping information in a frequency domain of the PDSCHs corresponding across the plurality of BWPs.

<3.9. Multi-Scheduling of a PDSCH and a PUSCH>

Here, an example in which one PDCCH schedules one or more PDSCHs and one or more PUSCHs in a predetermined slot in a case of single carrier and single slot will be described.

Figure 22:
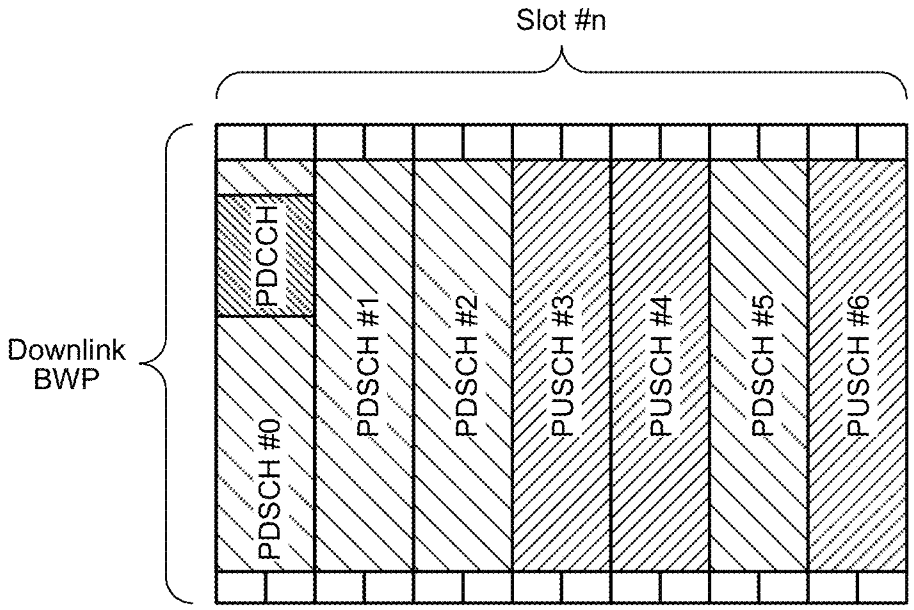
FIG. 22 is a view for describing an example of a multi-scheduling method according to the embodiment of the present disclosure.

FIG. 22 is a view for describing an example of a multi-scheduling method according to the embodiment of the present disclosure. In the example of FIG. 22, the base station device 20 schedules four PDSCHs #0 to #2 and #5 and three PUSCHs #3, #4, and #6 by using one PDCCH.

In this case, DCI that schedules these PDSCHs and PUSCHs may be classified into the following types. These types may be prescribed in advance, or may be set to be specific to the cell 110 or specific to the terminal device 40 through RRC signaling.

- Transmission parameter common to all scheduled PDSCHs and PUSCHs
- Common transmission parameter applied only to all scheduled PDSCHS
- Common transmission parameter applied only to all scheduled PUSCHs
- Transmission parameters respectively specific to the scheduled PDSCHs or PUSCHs Examples of the transmission parameter common to all the scheduled PDSCHs and PUSCHs include information related to resource mapping in a frequency domain.

Examples of the common transmission parameter applied only to all the scheduled PDSCH include, for example, information related to a beam in a downlink, an MCS, and the like.

Examples of the common transmission parameter applied only to all the scheduled PUSCHs include, for example, information related to a beam in an uplink, an MCS, and information related to transmission power control.

Examples of the transmission parameter specific to each of the scheduled PDSCHs or PUSCHs include information related to an HARQ process, information related to retransmission control, information related to resource mapping in a time domain, and the like.

The multi-scheduling method described herein may be performed in combination with the other scheduling methods described above.

<3.10. Multi-PSSCH Scheduling Method for High-Speed Communication URLLC>

The above-described scheduling method of the plurality of PDSCHs and/or PUSCHs may also be applied to scheduling of a plurality of physical sidelink shared channels (PSSCHs). The PSSCHs are data channels used in terminal-to-terminal communication (device-to-device communication (D2D communication), sidelink communication, and PC5 communication).

The PDSCHs and the PUSCHs described above can be replaced with the PSSCHs. In addition, the PDCCH described above can be replaced with a physical sidelink control channel (PSCCH). Specifically, the DCI described in the scheduling by the dual DCI can be replaced with sidelink control information (SCI).

A plurality of scheduling modes in the terminal-to-terminal communication is defined as, for example, a first mode and a second mode.

In the first mode, the base station device 20 determines a resource to be used for sidelink communication, and notifies a transmission terminal (Tx UE) of control information indicating the resource through the PDCCH. The Tx UE transmits a PSCCH and PSSCHs to a reception terminal (Rx UE) by using the resource. The PSCCH includes scheduling information from the Tx UE to the Rx UE.

For example, the base station device 20 notifies the Tx UE of a large resource. The Tx UE divides the resource and transmits a plurality of PSSCHs. At this time, similarly to the scheduling method described above, the Tx UE transmits scheduling information of the plurality of PSSCHs by one PSCCH.

In the second mode, the Tx UE selects a resource from a part or all of predetermined time-frequency resources (resource pool) preset by the base station device 20. The Tx UE transmits a PSCCH and PSSCHs to the Rx UE by using the selected resource.

Also in the second mode, similarly to the scheduling method described above, the Tx UE transmits scheduling information of the plurality of PSSCHs by one PSCCH.

Furthermore, in the second mode, when the Tx UE selects a resource, a usage condition in a predetermined resource is sensed in advance in order to reduce a collision with transmission data from another Tx UE.

This sensing is usually performed in units of slots (14 OFDM symbols). In the present embodiment, the Tx UE may perform sensing on the basis of a time length corresponding to a symbol length of a PSSCH, or may perform sensing in units of slots as usual. In a case where sensing is performed in units of slots, selection of a resource is performed in units of slots. The Tx UE can transmit a plurality of PSSCHs by using a part of the selected slot.

4. Other Embodiments

The above-described embodiments and modification examples are examples, and various modifications and applications can be made.

For example, the control device that controls the base station device 20 and the terminal device 40 of the above-described embodiment may be implemented by a dedicated computer system or may be implemented by a general-purpose computer system.

For example, a communication program to execute the above-described operation is stored in a computer-readable recording medium such as an optical disk, a semiconductor memory, a magnetic tape, or a flexible disk and distributed. Then, for example, the program is installed in a computer and the above-described processing is executed, whereby the control device is configured. At this time, the control device may be a device (such as a personal computer) outside the transmission device and the reception device. Furthermore, the control device may be a device (such as a control unit) inside the transmission device or the reception device.

Furthermore, the communication program may be stored in a disk device included in a server device on a network such as the Internet in such a manner as to be downloadable to a computer. In addition, the above-described functions may be implemented by cooperation of an operating system (OS) and application software. In this case, a portion other than the OS may be stored in a medium and distributed, or the portion other than the OS may be stored in a server device and downloaded to a computer.

Furthermore, among the pieces of processing described in the above embodiment, a whole or part of the processing described to be automatically performed can be manually performed, or a whole or part of the processing described to be manually performed can be automatically performed by a known method. In addition, the processing procedures, specific names, and information including various kinds of data or parameters in the above document or in the drawings can be arbitrarily changed unless otherwise specified. For example, various kinds of information illustrated in each of the drawings are not limited to the illustrated information.

In addition, each component of each of the illustrated devices is a functional concept, and does not need to be physically configured in the illustrated manner. That is, a specific form of distribution/integration of each device is not limited to what is illustrated in the drawings, and a whole or part thereof can be functionally or physically distributed/integrated in an arbitrary unit according to various loads and usage conditions. Note that this configuration by distribution/integration may be performed dynamically.

In addition, the above-described embodiments can be arbitrarily combined in a region in which the processing contents do not contradict each other. Furthermore, order of steps illustrated in the sequence diagram of the above-described embodiment can be changed as appropriate.

Furthermore, for example, the present embodiment can be implemented as any configuration included in a device or a system, such as a processor as system large scale integration (LSI) or the like, a module that uses a plurality of processors or the like, a unit that uses a plurality of modules or the like, a set acquired by further addition of other functions to the unit, or the like (that is, a configuration of a part of the device).

In addition, although a case where the target radio access technology is LTE, NR, or a combination thereof has been mainly described in some of the embodiments described above, this is not a limitation. For example, application to a radio access technology in 6G communication that is a next generation of 5G NR is possible. For example, the terminal device and the base station device described above may be 6G UE and a 6G base station. For proper nouns of functions, entities, standards, and information (parameters) of LTE and 5G NR in some of the embodiments described above, the same names may be used in 6G, or names specific to 6G may be used. That is, various proper nouns in some of the embodiments described above may be substituted by generalized names or descriptions.

Note that a system means a set of a plurality of components (such as devices and modules (parts)) and it does not matter whether all the components are in the same housing in the present embodiment. Thus, a plurality of devices housed in separate housings and connected via a network, and one device in which a plurality of modules is housed in one housing are both systems.

Furthermore, for example, the present embodiment can adopt a configuration of cloud computing in which one function is shared and processed by a plurality of devices in cooperation via a network.

5. Conclusion

Although embodiments of the present disclosure have been described above, the technical scope of the present disclosure is not limited to the above-described embodiments as they are, and various modifications can be made within the spirit and scope of the present disclosure. In addition, components of different embodiments and modification examples may be arbitrarily combined.

Furthermore, an effect in each of the embodiments described in the present specification is merely an example and is not a limitation, and there may be another effect.

Note that the present technology can also have the following configurations.

(1)

A terminal device, comprising:

a transceiver; and a hardware processor, wherein the hardware processor receives one physical downlink control channel (PDCCH) through the transceiver, the one PDCCH schedules a plurality of physical shared channels in one or more carriers or one or more slots, the one PDCCH and a plurality of the physical shared channels are transmitted to the terminal device, and a plurality of the physical shared channels is a plurality of physical downlink shared channels (PDSCH) or a plurality of physical uplink shared channels (PUSCH).

(2)

The terminal device according to (1), wherein among communication parameters applied to a plurality of the physical shared channels scheduled by the one PDCCH, a part of the communication parameters is applied in common to a plurality of the physical shared channels, and rest of the communication parameters are respectively applied to a plurality of the physical shared channels in a dedicated manner.

(3)

The terminal device according to (2), wherein the part of the communication parameters is applied in common to a plurality of the physical shared channels within at least one of a predetermined time length or a predetermined frequency band.

(4)

The terminal device according to (2) or (3), in which the communication parameters include a parameter related to resource mapping in at least one of a time domain or a frequency domain.

(5)

The terminal device according to anyone of (1) to (4), wherein the transceiver supports communication in which a mapping type of the physical shared channel is a type B.

(6)

The terminal device according to anyone of (1) to (5), wherein start symbols of a plurality of the physical shared channels are notified in a bitmap format.

(7)

The terminal device according to anyone of (1) to (5), wherein start symbols of a plurality of the physical shared channels are notified as information indicating relative positions with respect to a predetermined symbol position of the one PDCCH.

(8)

The terminal device according to anyone of (1) to (7), wherein a plurality of the physical shared channels is scheduled on a basis of a slot format.

(9)

The terminal device according to anyone of (1) to (8), wherein the one PDCCH includes a part of control information, and the physical shared channel includes at least a part of rest of the control information.

(10)

The terminal device according to (9), in which the control information included in the one PDCCH includes information related to communication parameters of a plurality of the physical shared channels in a plurality of slots, and the control information included in the physical shared channel includes information related to the communication parameters of a plurality of the physical shared channels in the slot in which the physical shared channel is arranged.

(11)

The terminal device according to (9), in which the control information included in the one PDCCH includes information related to communication parameters of a plurality of the physical shared channels in a plurality of frequency bands, and the control information included in the physical shared channel includes information related to the communication parameters of a plurality of the physical shared channels in the frequency band in which the physical shared channel is arranged.

(12)

The terminal device according to (9), in which the control information included in the one PDCCH includes information related to communication parameters of a plurality of the physical shared channels in a plurality of frequency bands, and the control information included in the physical shared channel includes information related to the communication parameter of the physical shared channel that corresponds to the physical shared channel to which the control information is mapped and that is arranged in a plurality of the frequency bands.

(13)

The terminal device according to anyone of (1) to (12), wherein a plurality of the physical shared channels is one or more PDSCHs and one or more PUSCHs.

(14)

A base station device comprising:

a transceiver; and a hardware processor, wherein the hardware processor transmits one physical downlink control channel (PDCCH) to a terminal device through the transceiver, the one PDCCH schedules a plurality of physical shared channels in one or more carriers or one or more slots, the one PDCCH and a plurality of the physical shared channels are transmitted to the terminal device, and a plurality of the physical shared channels is a plurality of physical downlink shared channels (PDSCH) or a plurality of physical uplink shared channels (PUSCH).

(15)

The base station device according to (14), wherein among communication parameters applied to a plurality of the physical shared channels scheduled by the one PDCCH, a part of the communication parameters is applied in common to a plurality of the physical shared channels, and rest of the communication parameters are respectively applied to a plurality of the physical shared channels in a dedicated manner.

(16)

The base station device according to (15), wherein the part of the communication parameters is applied in common to a plurality of the physical shared channels within at least one of a predetermined time length or a predetermined frequency band.

(17)

The base station device according to (15) or (16), in which the communication parameters include a parameter related to resource mapping in at least one of a time domain or a frequency domain.

(18)

The base station device according to anyone of (14) to (17), wherein the transceiver supports communication in which a mapping type of the physical shared channel is a type B.

(19)

The base station device according to anyone of (14) to (18), wherein start symbols of a plurality of the physical shared channels are notified in a bitmap format.

(20)

The base station device according to anyone of (14) to (18), wherein start symbols of a plurality of the physical shared channels are notified as information indicating relative positions with respect to a predetermined symbol position of the one PDCCH.

(21)

The base station device according to anyone of (14) to (20), wherein a plurality of the physical shared channels is scheduled on a basis of a slot format.

(22)

The base station device according to anyone of (14) to (21) wherein the one PDCCH includes a part of control information, and the physical shared channel includes at least a part of rest of the control information.

(23)

The base station device according to (22), in which the control information included in the one PDCCH includes information related to communication parameters of a plurality of the physical shared channels in a plurality of slots, and the control information included in the physical shared channel includes information related to the communication parameters of a plurality of the physical shared channels in the slot in which the physical shared channel is arranged.

(24)

The base station device according to (22), in which the control information included in the one PDCCH includes information related to communication parameters of a plurality of the physical shared channels in a plurality of frequency bands, and the control information included in the physical shared channel includes information related to the communication parameters of a plurality of the physical shared channels in the frequency band in which the physical shared channel is arranged.

(25)

The base station device according to (22), in which the control information included in the one PDCCH includes information related to communication parameters of a plurality of the physical shared channels in a plurality of frequency bands, and the control information included in the physical shared channel includes information related to the communication parameter of the physical shared channel that corresponds to the physical shared channel to which the control information is mapped and that is arranged in a plurality of the frequency bands.

(26)

The base station device according to anyone of (14) to (25), wherein a plurality of the physical shared channels is one or more PDSCHs and one or more PUSCHs.

(27)

A communication method of a terminal device, comprising:

receiving one physical downlink control channel (PDCCH), wherein the one PDCCH schedules a plurality of physical shared channels in one or more carriers or one or more slots, the one PDCCH and a plurality of the physical shared channels are transmitted to the terminal device, and a plurality of the physical shared channels is a plurality of physical downlink shared channels (PDSCH) or a plurality of physical uplink shared channels (PUSCH).

(28)

A communication method of a base station device, comprising:

transmitting one physical downlink control channel (PDCCH) to a terminal device, wherein the one PDCCH schedules a plurality of physical shared channels in one or more carriers or one or more slots, the one PDCCH and a plurality of the physical shared channels are transmitted to the terminal device, and a plurality of the physical shared channels is a plurality of physical downlink shared channels (PDSCH) or a plurality of physical uplink shared channels (PUSCH).

REFERENCE SIGNS LIST

1 COMMUNICATION SYSTEM
20 BASE STATION DEVICE
21, 41 SIGNAL PROCESSING UNIT
22, 42 STORAGE UNIT
23 NETWORK COMMUNICATION UNIT
24, 45 CONTROL UNIT
40 TERMINAL DEVICE
44 INPUT/OUTPUT UNIT

The invention claimed is:

1. A terminal device, comprising:

a transceiver; and a hardware processor, wherein the hardware processor receives a single physical downlink control channel (PDCCH) through the transceiver, wherein the single PDCCH schedules a plurality of physical shared channels that are to be received through the transceiver in one or more carriers or one or more slots, and wherein the plurality of physical shared channels is at least one of a plurality of physical downlink shared channels (PDSCHs) or a plurality of physical uplink shared channels (PUSCHs), and wherein communication parameters applied to the plurality of physical shared channels and that are included in the single PDCCH include at least one of time domain information or frequency domain information.

2. The terminal device according to claim 1, wherein among the communication parameters applied to the plurality of physical shared channels scheduled by the single PDCCH, a first part of the communication parameters is applied in common to the plurality of physical shared channels, and a second part of the communication parameters, different from the first part of the communication parameters, are respectively applied to the plurality of physical shared channels in a dedicated manner.

3. The terminal device according to claim 2, wherein the first part of the communication parameters is applied in common to the plurality of physical shared channels within at least one of a predetermined time length or a predetermined frequency band.

4. The terminal device according to claim 1, wherein the transceiver supports communication in which a mapping type of the physical shared channel is a type B.

5. The terminal device according to claim 1, wherein start symbols of the plurality of physical shared channels are notified in a bitmap format.

6. The terminal device according to claim 1, wherein start symbols of the plurality of physical shared channels are notified as information indicating relative positions with respect to a predetermined symbol position of the single PDCCH.

7. The terminal device according to claim 1, wherein the plurality of physical shared channels is scheduled on a basis of a slot format.

8. The terminal device according to claim 1, wherein the single PDCCH includes a first part of control information, and the physical shared channel includes at least a part of a second part of the control information that is different from the first part of the control information.

9. The terminal device according to claim 1, wherein the plurality of physical shared channels is one or more of the plurality of PDSCHs and of the plurality of one or more PUSCHs.

10. The terminal device according to claim 1, wherein the time domain information comprises at least one of:

a number of channels of the plurality of physical shared channels that are continuously scheduled in a time direction, a number of symbols for each of the plurality of physical shared channels, a start and stop position of the plurality of physical shared channels, and slot identification information, and wherein the frequency domain information comprise at least one of:

a frequency bandwidth of the plurality of physical shared channels, a start and stop position in the frequency domain of the plurality of physical shared channels, a frequency hopping indicator, and at least one of bandwidth part (BWP) information or component carrier information.

11. The terminal device according to claim 1, wherein communication parameters applied to the plurality of physical shared channels and that are included in the single PDCCH include at least one of:

a parameter related to Multi-Input Multi-Output (MIMO), a parameter related to pre-coding, a parameter related to antenna port assignment, a parameter related to quasi co-location (QCL), one or more parameters related to hybrid automatic repeat request (HARQ) control, or one or more parameters related to modulation, scrambling, transmission power control, or priority.

12. A base station device comprising:

a transceiver; and a hardware processor, wherein the hardware processor transmits a single physical downlink control channel (PDCCH) to a terminal device through the transceiver, wherein the single PDCCH schedules a plurality of physical shared channels that are to be transmitted to the terminal device through the transceiver in one or more carriers or one or more slots, and wherein the plurality of physical shared channels is at least one of a plurality of physical downlink shared channels (PDSCHs) or a plurality of physical uplink shared channels (PUSCHs), and wherein communication parameters applied to the plurality of physical shared channels and that are included in the single PDCCH include at least one of time domain information or frequency domain information.

13. The base station device according to claim 12, wherein among the communication parameters applied to the plurality of physical shared channels scheduled by the single PDCCH, a first part of the communication parameters is applied in common to the plurality of physical shared channels, and a second part of the communication parameters, different from the first part of the communication parameters, are respectively applied to the plurality of physical shared channels in a dedicated manner.

14. The base station device according to claim 13, wherein the first part of the communication parameters is applied in common to the plurality of physical shared channels within at least one of a predetermined time length or a predetermined frequency band.

15. The base station device according to claim 12, wherein the transceiver supports communication in which a mapping type of the physical shared channel is a type B.

16. The base station device according to claim 12, wherein start symbols of the plurality of physical shared channels are notified in a bitmap format.

17. The base station device according to claim 12, wherein start symbols of the plurality of physical shared channels are notified as information indicating relative positions with respect to a predetermined symbol position of the single PDCCH.

18. The base station device according to claim 12, wherein the plurality of physical shared channels is scheduled on a basis of a slot format.

19. The base station device according to claim 12, wherein the single PDCCH includes a first part of control information, and the physical shared channel includes at least a part of a second part of the control information that is different from the first part of the control information.

20. The base station device according to claim 12, wherein the plurality of physical shared channels is one or more of the plurality of PDSCHs and one or more of the plurality of PUSCHs.

21. The base station device according to claim 12, wherein the time domain information comprises at least one of:

a number of channels of the plurality of physical shared channels that are continuously scheduled in a time direction, a number of symbols for each of the plurality of physical shared channels, a start and stop position of the plurality of physical shared channels, and slot identification information, and wherein the frequency domain information comprise at least one of:

a frequency bandwidth of the plurality of physical shared channels, a start and stop position in the frequency domain of the plurality of physical shared channels, a frequency hopping indicator, and at least one of bandwidth part (BWP) information or component carrier information.

22. The base station device according to claim 12, wherein communication parameters applied to the plurality of physical shared channels and that are included in the single PDCCH include at least one of:

a parameter related to Multi-Input Multi-Output (MIMO), a parameter related to pre-coding, a parameter related to antenna port assignment, a parameter related to quasi co-location (QCL), one or more parameters related to hybrid automatic repeat request (HARQ) control, or one or more parameters related to modulation, scrambling, transmission power control, or priority.

23. A communication method of a terminal device, comprising:

receiving a single physical downlink control channel (PDCCH); and receiving a plurality of physical shared channels, wherein the single PDCCH schedules the plurality of physical shared channels in one or more carriers or one or more slots, and wherein the plurality of physical shared channels is at least one of a plurality of physical downlink shared channels (PDSCHs) or a plurality of physical uplink shared channels (PUSCHs), and wherein communication parameters applied to the plurality of physical shared channels and that are included in the single PDCCH include at least one of time domain information or frequency domain information.

24. A communication method of a base station device, comprising:

transmitting a single physical downlink control channel (PDCCH) to a terminal device; and transmitting a plurality of physical shared channels to the terminal device, wherein the single PDCCH schedules the plurality of physical shared channels in one or more carriers or one or more slots, and wherein the plurality of physical shared channels is at least one of a plurality of physical downlink shared channels (PDSCHs) or a plurality of physical uplink shared channels (PUSCHs), and wherein communication parameters applied to the plurality of physical shared channels and that are included in the single PDCCH include at least one of time domain information or frequency domain information.

* * * * *